(12) United States Patent
Reubeuze et al.

(10) Patent No.: US 7,475,945 B2
(45) Date of Patent: Jan. 13, 2009

(54) HINGE MECHANISM FOR A VEHICLE SEAT, AND A SEAT INCLUDING SUCH A MECHANISM

(75) Inventors: Yann Reubeuze, Landigou (FR); Ange Sechet, La Selle La Forge (FR)

(73) Assignee: FAURECIA Sieges d'Automobile, Nanterre (FR)

( * ) Notice: Subject to any disclaimer, the term of this patent is extended or adjusted under 35 U.S.C. 154(b) by 503 days.

(21) Appl. No.: 11/191,177

(22) Filed: Jul. 27, 2005

(65) Prior Publication Data

US 2006/0022503 A1 Feb. 2, 2006

(30) Foreign Application Priority Data

Jul. 29, 2004 (FR) .................................. 04 08403

(51) Int. Cl.
*B60N 2/22* (2006.01)
(52) U.S. Cl. ..................................... 297/367
(58) Field of Classification Search ................. 297/366, 297/367, 368, 369, 370, 354.12
See application file for complete search history.

(56) References Cited

U.S. PATENT DOCUMENTS

| 4,384,050 | A | | 5/1983 | Guthrie |
| 5,590,931 | A | * | 1/1997 | Fourrey et al. ............... 297/366 |
| 5,769,494 | A | | 6/1998 | Barrere et al. |
| 5,779,313 | A | | 7/1998 | Rohee |
| 5,820,219 | A | | 10/1998 | Rohee |
| 5,857,746 | A | * | 1/1999 | Barrere et al. ............... 297/367 |
| 6,007,153 | A | | 12/1999 | Benoit et al. |
| 6,112,370 | A | * | 9/2000 | Blanchard et al. ............. 16/325 |
| 6,120,098 | A | | 9/2000 | Magyar et al. |
| 6,164,723 | A | | 12/2000 | Ganot |
| 6,676,217 | B2 | * | 1/2004 | Lange ........................ 297/367 |
| 7,165,813 | B2 | * | 1/2007 | Tame ......................... 297/367 |
| 7,168,764 | B2 | * | 1/2007 | Reubeuze et al. ........... 297/367 |
| 2003/0025376 | A1 | * | 2/2003 | Moriyama et al. .......... 297/367 |

FOREIGN PATENT DOCUMENTS

| EP | 769 409 | 4/1997 |
| FR | 2 462 127 | 2/1981 |
| FR | 2 740 406 | 4/1997 |
| FR | 2 748 974 | 12/1997 |
| FR | 2 766 138 | 1/1999 |
| FR | 2 777 234 | 10/1999 |

OTHER PUBLICATIONS

French Search Report, Application No. FR 0408403, dated Mar. 14, 2005.

* cited by examiner

*Primary Examiner*—Joseph F Edell
(74) *Attorney, Agent, or Firm*—McCracken & Frank LLP

(57) ABSTRACT

A hinge mechanism comprising first and second connection members mounted to pivot relative to each other and having first and second circular locking bearing surfaces co-operating with respective ones of first and second locking shoes that are part of the slugs so as to hold the first and second connection members stationary, and a control device for putting the slugs in engagement with the first and second locking bearing surfaces while allowing the slugs to pivot to a certain extent about their own axes.

30 Claims, 30 Drawing Sheets

FIG. 29
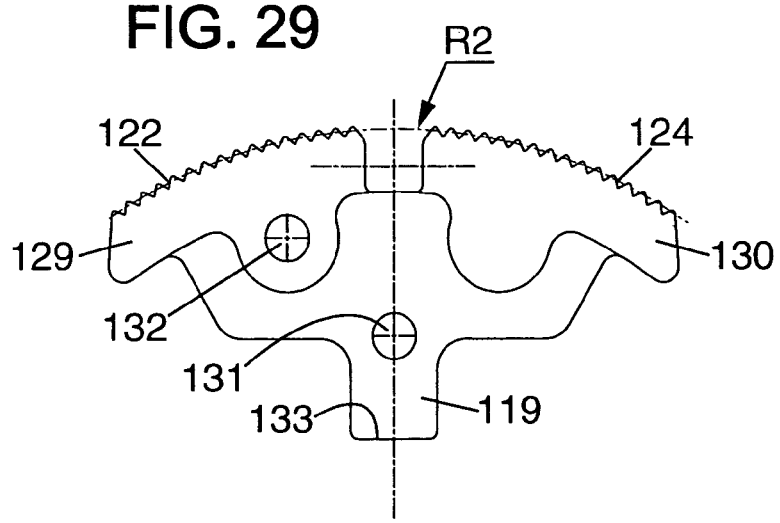
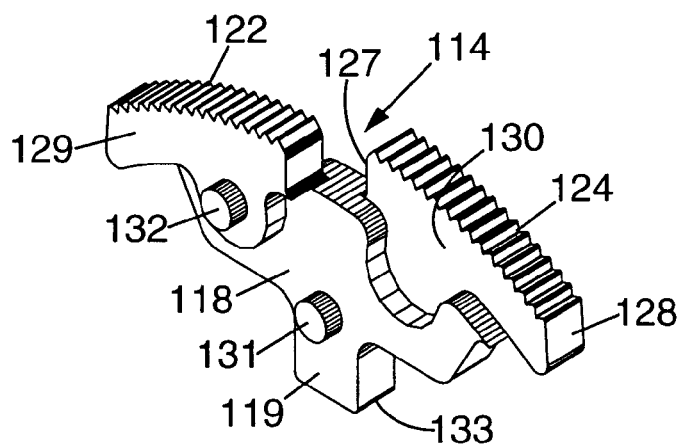
FIG. 30
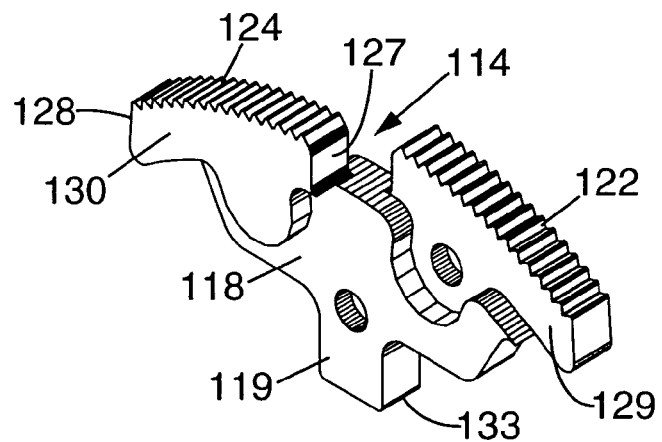
FIG. 31

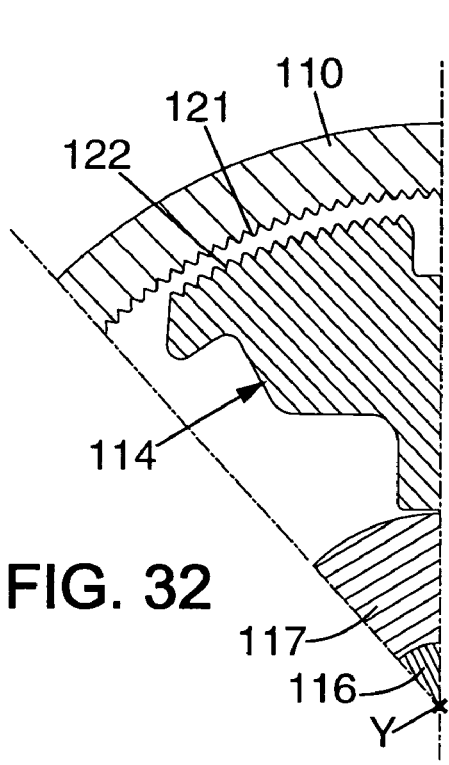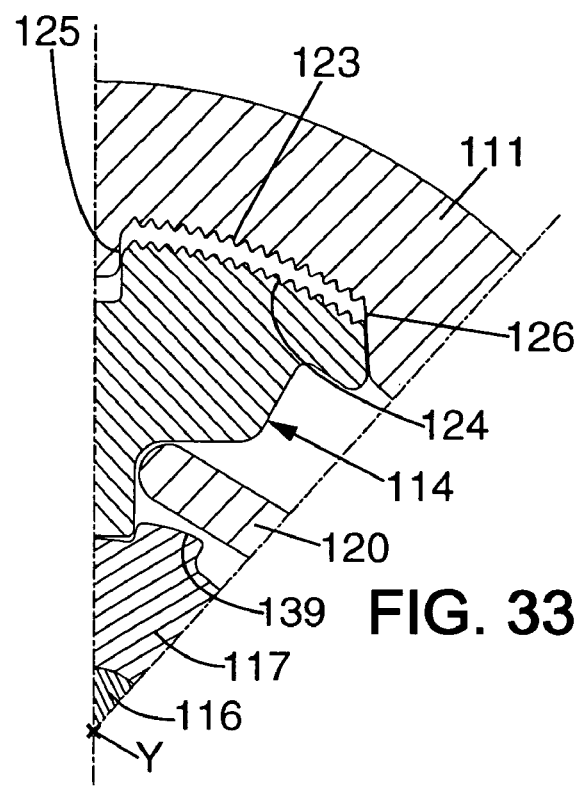

HINGE MECHANISM FOR A VEHICLE SEAT, AND A SEAT INCLUDING SUCH A MECHANISM

FIELD OF THE INVENTION

The present invention relates to hinge mechanisms for vehicle seats and to seats including such mechanisms.

More particularly, the invention relates to a hinge mechanism designed to enable two elements to be adjusted angularly relative to each other, said hinge mechanism comprising:
- first and second rigid connection members mounted to pivot relative to each other and designed to be connected to respective ones of the two elements to be adjusted, each of said first and second connection members having at least first and second locking bearing surfaces that are circular (optionally forming full circles) and that face radially;
- at least one rigid slug disposed facing said first and second locking bearing surfaces; and
- a control device adapted to move said slug for selectively locking and releasing the first and second connection members relative to each other.

BACKGROUND OF THE INVENTION

Document FR-A-2 462 127 describes an example of such a hinge mechanism.

OBJECTS AND SUMMARY OF THE INVENTION

A particular object of the invention is to provide a novel hinge mechanism that can, if necessary, offer strength that is improved and/or angular slack that is reduced compared with prior art mechanisms.

To this end, according to the invention, in a hinge mechanism of the type in question, the slug includes a first locking shoe adapted to come into engagement (e.g. by meshing or by friction) with the first locking bearing surface only, and a second locking shoe adapted to come into engagement (e.g. by meshing or by friction) with the second locking bearing surface only, said first and second locking shoes being offset angularly relative to each other about the pivot axis (in other words the first and second locking shoes are not disposed on the same radius starting from the pivot axis).

By means of these provisions, a hinge mechanism is obtained that offers particularly high rupture strength, because each locking shoe of the slug comes exactly into engagement with the corresponding locking bearing surface by the slug self-positioning, so as to withstand the relative rotation forces between the two connection members.

In various embodiments of the invention, it is optionally possible also to use one or more of the following provisions:
- the slug is adapted to self-position by pivoting to a small extent in a plane perpendicular to the pivot axis, thereby guaranteeing good locking on the corresponding locking bearing surface;
- the first and second locking bearing surfaces face radially inwards relative to the pivot axis;
- the first and second locking bearing surfaces comprise respective ones of first and second sets of teeth and the slug has teeth adapted to come into engagement with said first and second sets of teeth;
- the first and second locking bearings surfaces are superposed in adjacent and distinct planes that are perpendicular to the pivot axis, the first locking shoe is disposed in the same plane as the first locking bearing surface and the second locking shoe is disposed in the same plane as the second locking bearing surface;
- the slug is adapted to pivot about its own axis in a plane perpendicular to the pivot axis;
- the first and second locking bearing surfaces have the same first radius (e.g. equal to the pitch circle radius of the sets of teeth if said locking bearing surfaces are toothed), the first and second locking shoes being in the shape of circular arcs having the same radius (e.g. equal to the pitch circle radius of the sets of teeth if said locking shoes are toothed);
- the second radius is equal to or close to the first radius;
- the first and second locking bearing surfaces have sets of teeth that have a pitch circle radius substantially equal to said first radius, the first and second locking shoes having circularly arcuate sets of teeth having a pitch circle radius substantially equal to the second radius;
- the first and second radii are adapted so that the slug can self-position and so that its first and second locking shoes are both in engagement with the first and second locking bearing surfaces;
- the second radius is smaller than the first radius by an amount in the range 1% to 5%;
- the control device comprises at least one pivotally mounted first cam adapted to move the slug radially;
- the hinge mechanism has a plurality of similar slugs distributed angularly about the pivot axis, the control mechanisms being adapted to put the slugs selectively into engagement with the first and second locking bearing surfaces;
- the first and second locking bearing surfaces are superposed in adjacent and distinct planes that are perpendicular to the pivot axis, the first locking shoe is disposed in the same plane as the first locking bearing surface and the second locking shoe is disposed in the same plane as the second locking bearing surface; and
- the first locking shoe of one of the slugs is superposed at least in part on the second locking shoe of at least an adjacent slug;
- the first and second locking bearing surfaces face axially inwards relative to the pivot axis;
- the control device comprises first and second pivotally mounted cams that are urged resiliently towards respective locking positions in which said first and second cams normally hold the first and second locking shoes in engagement respectively with the first and second locking bearing surfaces, the control device further including at least one actuating member adapted to move the first cam towards an unlocking position; and
- the slug is adapted to pivot about its second locking shoe towards a first retracted position in which the first locking shoe is not in engagement with the first locking bearing surface, when the second cam is in its locking position and the first cam is in its unlocking position;
- the first cam is adapted to positively driving the slug to pivot into the first retracted position when said first cam is moved from its locking position to its unlocking position;
- the first cam has a cam surface and a hook, the cam surface of the first cam being adapted to act by a camming effect on the slug so as to hold the first locking shoe in engagement with the first locking bearing surface when the first cam is in the locking position, and the hook of the first cam being adapted to engage over a first unlocking finger that is part of the slug in order to cause the slug to pivot towards the first retracted position when the first cam is moved towards its unlocking position;

the first and second locking bearing surfaces are superposed in adjacent and distinct planes that are perpendicular to the pivot axis, the first locking shoe is disposed in the same plane as the first locking bearing surface and the second locking shoe is disposed in the same plane as the second locking bearing surface, the first cam being disposed in the same plane as the first locking bearing surface;

the first cam can be moved in a first angular direction from its locking position to its unlocking position, and the slug is in the general shape of a circular arc that extends angularly between two ends that carry respective ones of the first and second locking shoes, the first unlocking finger extending in slanting manner radially inwards and in a second angular direction that is opposite to the first angular direction;

the hinge mechanism includes a plurality of similar slugs distributed angularly about the pivot axis, the first cam having a cam surface and a hook adjacent to each other for each slug, and said first cam having a respective recess between the cam surface and the hook corresponding to the same slug, the first unlocking finger of said slug projecting into said recess;

the slug is adapted to pivot about its first locking shoe towards a second retracted position in which the second locking shoe is not in engagement with the second locking bearing surface, when the first cam is in its locking position and the second cam is in an unlocking position;

the second cam is adapted to drive the slug positively to pivot into the second retracted position when said second cam is moved from its locking position to its unlocking position;

the second cam has a cam surface and a hook, the cam surface of the second cam being adapted to act by a camming effect on the slug so as to hold the second locking shoe in engagement with the second locking bearing surface when the second cam is in the locking position, and the hook of the second cam being adapted to engage over a second unlocking finger that is part of the slug so as to cause the slug to pivot towards its second retracted position when the second cam is moved towards its unlocking position;

the first and second locking bearing surfaces are superposed in distinct and adjacent planes that are perpendicular to the pivot axis, the first locking shoe is disposed in the same plane as the first locking bearing surface and the second locking shoe is disposed in the same plane as the second locking bearing surface, the second cam being disposed in the same plane as the second locking bearing surface;

the second cam can be moved in a second angular direction from its locking position to its unlocking position, and the slug is in the general shape of a circular arc that extends angularly between two ends carrying respective ones of the first and second locking shoes, the second unlocking finger extending in slanting manner radially inwards and in a first angular direction opposite to the second angular direction;

the hinge mechanism includes a plurality of similar slugs distributed angularly about the pivot axis, the second cam having a cam surface and a hook that are adjacent to each other for each slug, and said second cam having a respective recess between the cam surface and the hook corresponding to the same slug, the second unlocking finger of said slug projecting into said recess;

the actuating member is mounted to pivot about the pivot axis and is adapted to drive the first cam from its locking position to its unlocking position when said actuating member is moved in a first angular direction from a rest position, and the second cam can be moved from its locking position to its unlocking position by said actuating member when said actuating member pivots in a second angular direction from the rest position, said actuating member being connected with lost motion to the first and second cams so that pivoting the actuating member in the first angular direction into the releasing position of the second cam does not interfere with the second cam, and so that pivoting the actuating member in the second angular direction into the releasing position of the second cam does not interfere with the first cam;

the actuating member comprises a shaft passing through the first and second cams with clearance, and provided with at least one actuating finger penetrating into recesses provided in respective ones of the first and second cams and offset angularly relative to each other;

the first and second cams are connected to the shaft by respective ones of first and second springs, the first spring urging the first cam in the second angular direction relative to the shaft, and the second spring urging the second cam in the first angular direction relative to the shaft;

the first and second cams are connected to each other independently of the actuating finger via an additional connection limiting the extent to which said first and second cams can pivot angularly relative to each other.

the second connection member includes at least:

a latching zone making it possible for the slug to come into engagement with the second locking bearing surface; and a circularly arcuate guide surface centered on the pivot axis and facing radially inwards, said guide surface being adapted to guide the slug while holding it in the second retracted position when said slug is not in register with the latching zone;

the slug has a stud projecting towards the second connection member, said stud being adapted to come into abutment against the guide surface while holding the slug in the second retracted position when said slug is not in register with the latching zone, and said slug being adapted to penetrate into a notch provided in the second connection member when the slug is in register with the latching zone;

the second connection member has at least one abutment adapted to enable the slug to move relative to said second connection member in one angular direction only, when the slug is in the second retracted position;

the first and second locking bearing surfaces are superposed in distinct and adjacent planes that are perpendicular to the pivot axis, the hinge mechanism including a plurality of similar slugs, each of which is formed by a sheet metal plate having first and second flat portions carrying respective ones of the first and second locking shoes, and connected together via a fold, the first and second flat portions of each slug being disposed in respective ones of the planes of the first and second locking bearing surfaces, and the first flat portion of each slug being superposed at least in part on the second flat portion of an adjacent locking slug, the first and second cams being flat pieces of sheet metal lying in respective ones of the planes of the first and second locking bearing surfaces;

the slug is guided in radial sliding by the second connection member, the first cam being adapted to push back the slug radially outwards when said first cam is in the locking position, the first and second locking bearing surfaces facing radially inwards relative to the pivot axis;

the first and second locking bearing surfaces are superposed in distinct and adjacent planes that are perpendicular to the pivot axis, the first locking shoe is disposed in the same plane as the first locking bearing surface and the second locking shoe is disposed in the same plane as the second locking bearing surface;

the second connection member makes it possible for the slug to self-position;

the first and second locking bearing surfaces have the same radius, the first and second locking shoes being in the shape of circular arcs having the same radius;

the second radius is equal to or close to the first radius;

the second radius is smaller than the first radius by an amount in the range 1% to 5%; and the first and second locking bearing surfaces face radially inwards relative to the pivot axis;

the control device comprises a pivotally mounted cam superposed on a control mask and secured to said control mask, said cam and said mask being resiliently urged towards a locking position in which the cam holds the first and second locking shoes in engagement respectively with the first and second locking bearing surfaces, the control device further comprising at least one actuating member adapted to move the cam towards an unlocking position;

the slug is adapted to pivot about its second locking shoe towards a retracted position in which the first locking shoe is not in engagement with the first locking bearing surface, when the cam is in its unlocking position; and the control mask is adapted to act on the slug by causing it to pivot about its second locking shoe towards said retracted position when the cam is in its unlocking position.

In addition, the invention also provides a vehicle seat comprising a seat proper and a seat back connected together by at least one hinge mechanism as defined above.

BRIEF DESCRIPTION OF THE DRAWINGS

Other characteristics and advantages of the invention appear from the following description of four embodiments thereof, given by way of non-limiting example, and with reference to the accompanying drawings.

In the drawings:

FIG. 29 is a detail view of one of the slugs of the hinge mechanism of FIGS. 27 to 28;

FIGS. 30 and 31 are perspective views of the slug of FIG. 29, seen in two opposite directions;

FIGS. 32 and 33 are fragmentary section views of the right and left portions of one of the slugs of the hinge mechanism of FIGS. 26 to 28, the sections being taken respectively on line A-A and on line B-B of FIG. 26, while the inclination of the back of the seat is being adjusted;

In the various figures, like references designate elements that are identical or similar.

MORE DETAILED DESCRIPTION

Figure 1:
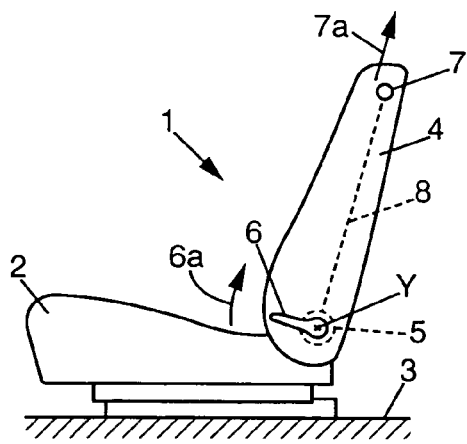
FIG. 1 is a diagrammatic view of a seat in which the inclination of the seat back is adjustable by means of at least one hinge mechanism in a first embodiment of the invention.

As shown diagrammatically in FIG. 1, the invention relates to a vehicle seat 1 which comprises firstly a seat proper 2 mounted on the floor 3 of the vehicle, and secondly a seat back 4 pivotally mounted on the seat proper 2 to pivot about a transverse horizontal axis Y, by means of at least one hinge mechanism 5.

For example, the hinge mechanism 5 can be controlled by a handle 6 which can be actuated in the direction 6a in order to release the seat back 4 by pivoting about the axis Y.

The seat back 4 can also have an additional drive member 7 (a handle or a drive member of some other type) which can be disposed, for example, at the top of the seat back 4 and which is connected to the hinge mechanism by a cable 8 such as a Bowden cable 8.

Figure 2:
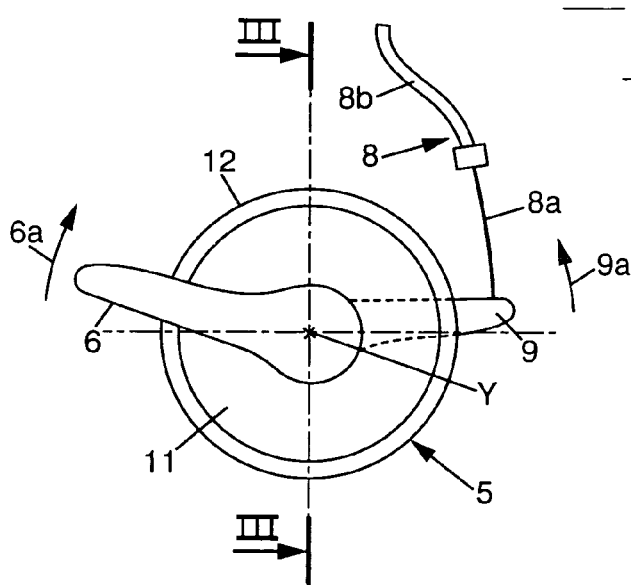
FIG. 2 is a detail view showing the hinge mechanism enabling the seat back of the seat of FIG. 1 to be angularly adjusted.

As shown in FIG. 2, one end of the core 8a of the Bowden cable 8 can be fastened, for example, to a lever 9 that is secured to or integral with the handle 6, the sheath 8b of the cable also being fastened to the framework of the seat back. For example, the lever 9 can be disposed so that actuating the handle 7, and thereby exerting traction on the core 8a of the cable 8, moves said lever 9 of the handle 6 in an angular direction 9a that is opposite from the above-mentioned direction 6a.

Figure 3:
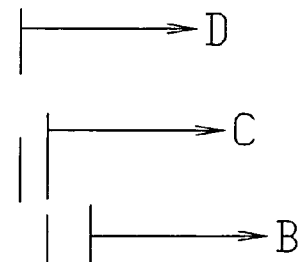
FIG. 3 is a section view on line III-III of FIG. 2.
Figure 4:
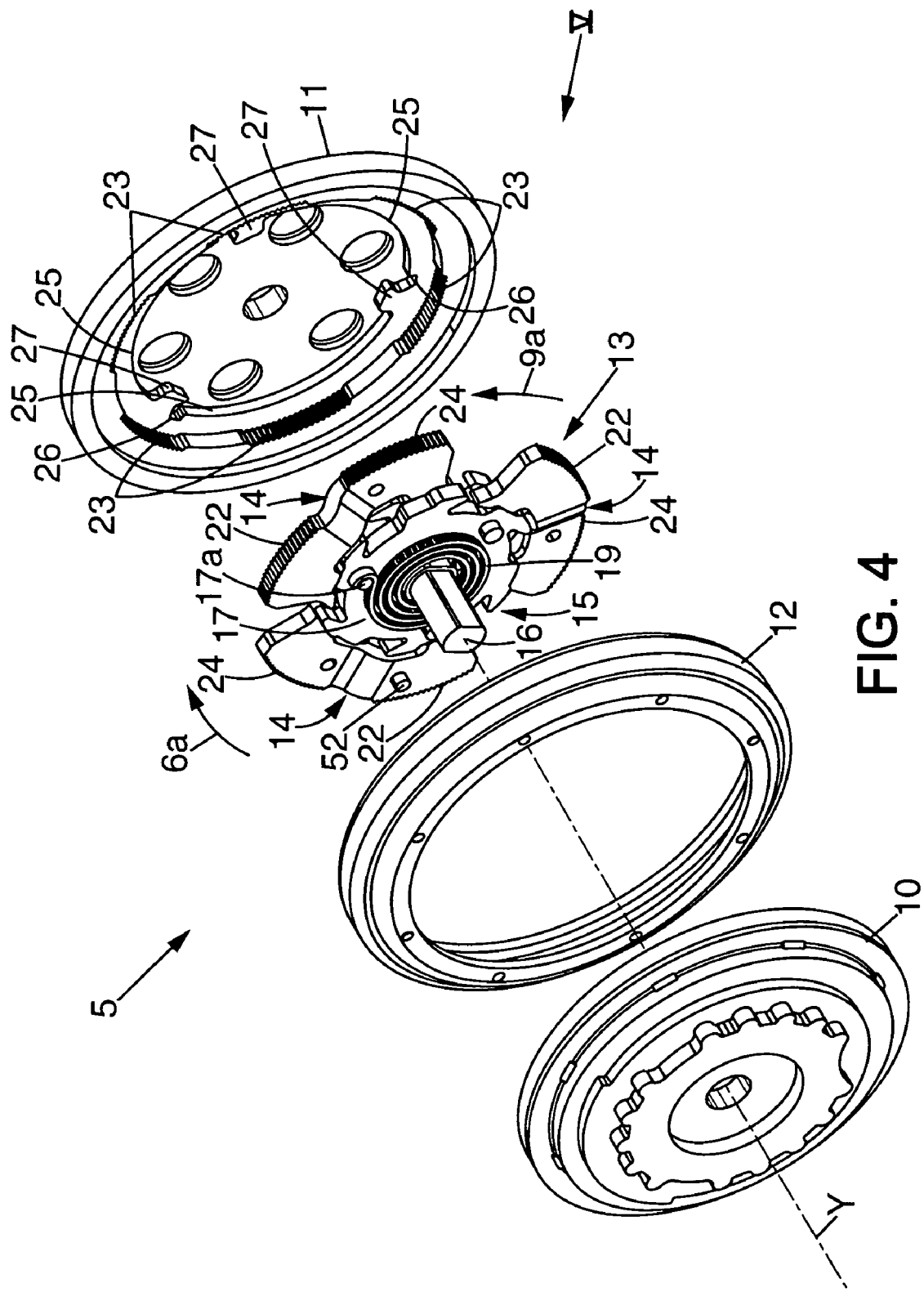
FIG. 4 is an exploded view of the hinge mechanism of FIG. 3.
Figure 5:
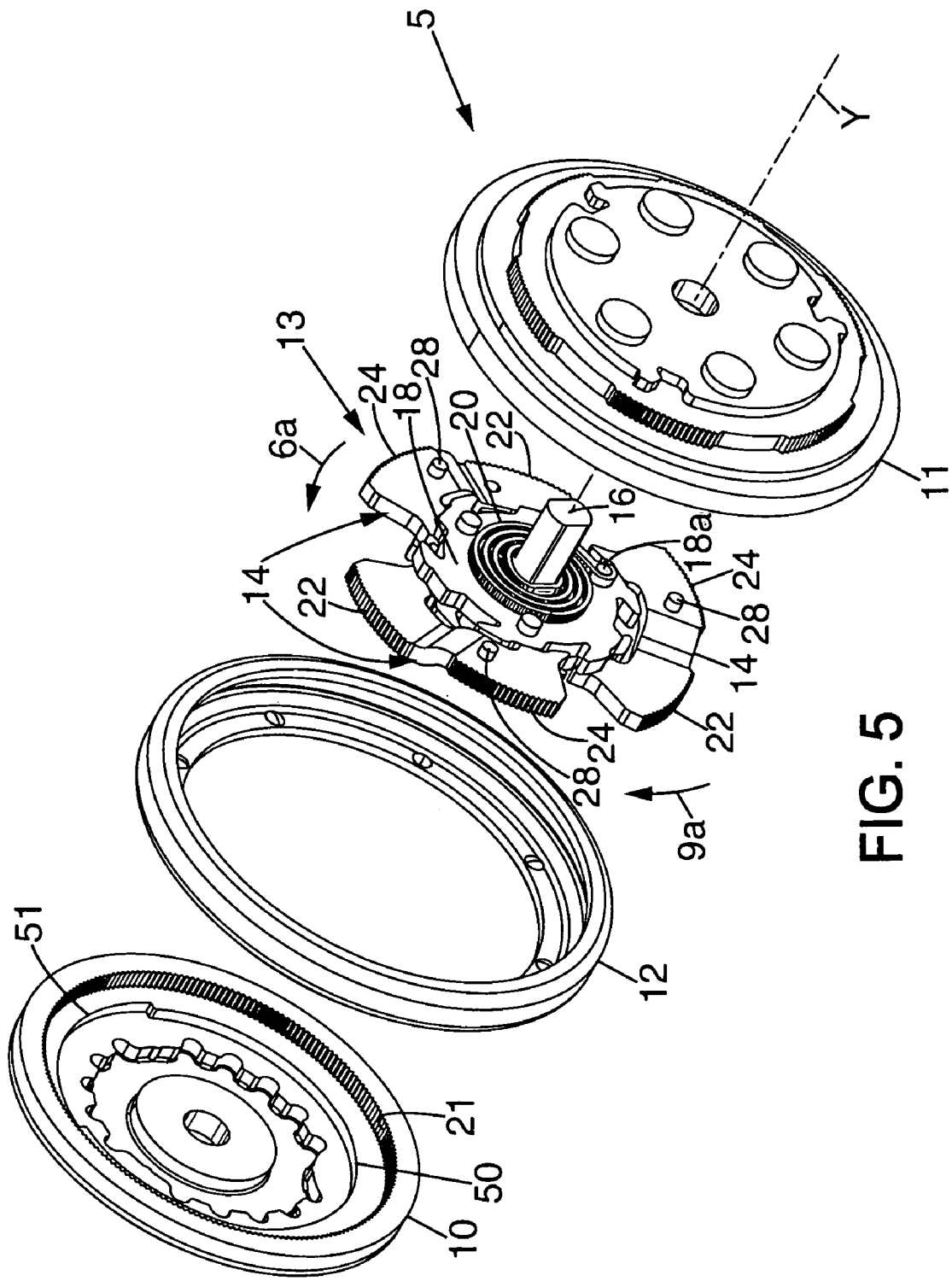
FIG. 5 is a view similar to FIG. 4, seen looking in the direction V of FIG. 4.

As shown in FIGS. 3 to 5, the hinge mechanism 5 can, for example, comprise:

a first rigid connection member 10, e.g. a metal cheek plate that is in the general shape of a disk centered on the pivot axis Y, and that is fastened, for example, to the framework of the seat back 4 (or optionally to the framework of the seat proper 2);

a second rigid connection member 11, e.g. a metal cheek plate that is in the general shape of a disk centered on the axis Y, said second connection member being fastened, for example, to the framework of the seat proper 2 (or optionally to the framework of the seat back 4);

a metal ring 12 crimped around the peripheries of the first and second connection members 10, 11 while enabling said connection members to move relative to each other about the axis Y (the crimped ring 12 could however be replaced with any other means making it possible to hold the two connection members 10, 11 against each other while leaving them free to pivot about the axis Y); and a locking device 13 adapted selectively to lock or to release the two connection members 10, 11 in relative rotation about the axis Y.

As shown in more detail in FIGS. 4 to 7, the locking device 13 comprises at least one rigid slug 14 that is circularly arcuate in general shape, e.g. it comprises three slugs 14 distributed angularly at 120° from one another about the axis Y, in the example considered herein.

The slugs 14 are controlled by a control device 15 (see also FIGS. 8 and 9) which, in the example shown, comprises:

a rigid central shaft 16 which is secured to the handle 6 and to the lever 9 (see FIG. 3); and first and second cams 17, 18 that can, for example, be superposed flat pieces of sheet metal, extending in respective ones of first and second distinct planes that are perpendicular to the pivot axis Y, the first and second cams being resiliently urged in respective angular directions, the first cam 17 being urged in the first angular direction 9a and the second cam 18 being urged in the second angular direction 6a.

For example, said cams 17, 18 can be urged resiliently by first and second springs 19, 20, e.g. spiral springs of substantially the same stiffness, the inner end of each spring being secured to the shaft 16, and its outer end bearing, for example, against a projecting stud 17a, 18a on the corresponding cam. For example, the inner ends of the springs 19, 20 can be secured to the shaft 16 by providing the shaft 16 with a shape that is not cylindrically symmetrical, and by shaping the radially-innermost portions of the springs 19, 20 so that these inner portions engage by being fitted against the periphery of the shaft 16.

In the example shown in the drawings, the first connection member 10 has a first locking bearing surface 21 that is circular and that faces radially inwards (in the example considered herein, the locking bearing surface 21 forms a full circle, but said locking bearing surface could be formed merely by one or more circular arcs centered on the pivot axis Y).

Said first locking bearing surface 21 is disposed in the same plane as the first cam 17, and each of the slugs 14 has a first locking shoe 22 disposed in the same plane, and that is adapted to come into engagement with the locking bearing surface 21, thereby holding said slugs 14 stationary relative to the first connection member 10.

In the example considered herein, the first locking bearing surface 21 is constituted by a set of teeth facing radially inwards, and the locking shoes 22 of the slugs are in the form of sets of teeth facing radially outwards. Optionally, the first locking bearing surface and the first locking shoes could also be constituted by non-toothed surfaces that co-operate by friction.

In addition, as shown in FIG. 4, the second connection member 11 also has at least one second locking bearing surface 23, and, in this example, six second locking bearing surfaces 23 that are distributed angularly at 60° from one another in the example considered herein. Said second locking bearing surfaces 23 have circular shapes (more particularly, circularly arcuate shapes) centered on the axis Y and, for example, of the same diameter as the first locking bearing surface 21.

The second locking bearing surfaces 23 face radially inwards in the same plane as the second cam 18. They are thus immediately adjacent to the first locking bearing surface 22, along the axis Y.

Each of the slugs 14 has a second locking shoe 24 which is also disposed in the same plane as the second cam 18, and which is adapted to come into engagement with one of the second locking bearings surfaces 23 of the second connection member 11. The second locking shoe is offset angularly relative to the first locking shoe 22, and it is disposed so that the two locking shoes 22, 24 do not overlap axially at all.

In the example considered herein, the second locking bearing surfaces 23 and the second locking shoes 24 are constituted by sets of teeth facing respectively radially inwards and radially outwards, but said second locking bearings surfaces could be surfaces that co-operate by friction.

As can be seen in FIG. 4, the second connection member 11 also has circular guide surfaces 25 that are centered on the axis Y and that face radially inwards. Each of the guide surfaces 25 extends angularly in an angular direction 6a between an abutment 27 that projects radially inwards and a notch 26 that extends radially outwards, said notch 26 being adjacent to another abutment 27 (there are also three notches 26 and three abutments 27 in the example considered herein).

The guide surfaces 25, the notches 26 and the abutments 27 co-operate with the slugs 14, e.g. with projecting studs 28 carried by each of the slugs 14, facing the locking shoe 24. The studs 28 in question are normally engaged in the above-mentioned notches 26 so as to enable the second locking shoes 24 of the slugs to be in engagement with the second locking bearing surfaces 23 of the second connection member.

Figure 6:
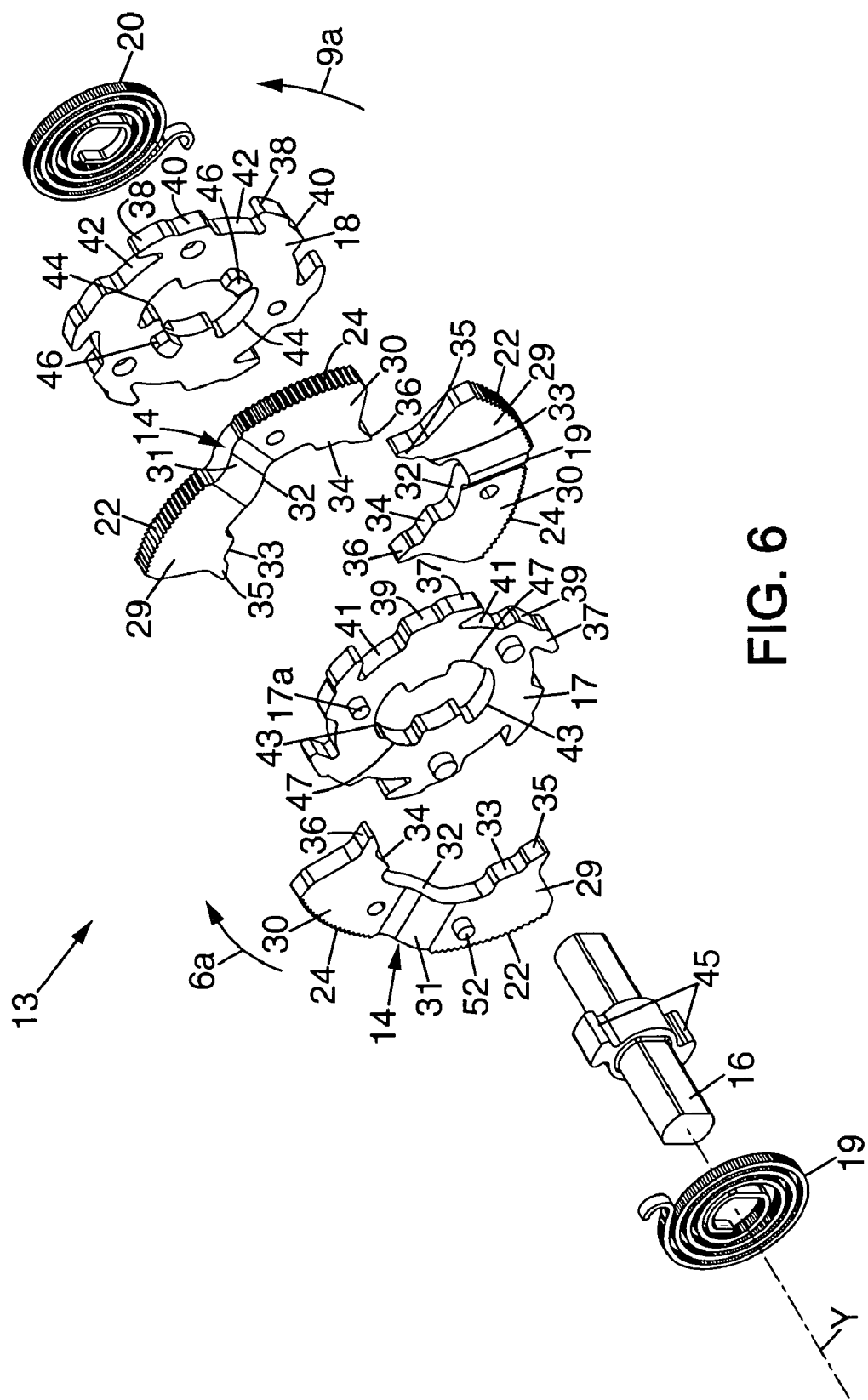
FIG. 6 is an exploded view showing, in detail, the locking device of the hinge mechanism of FIG. 4, seen looking in the same direction as FIG. 4.
Figure 7:
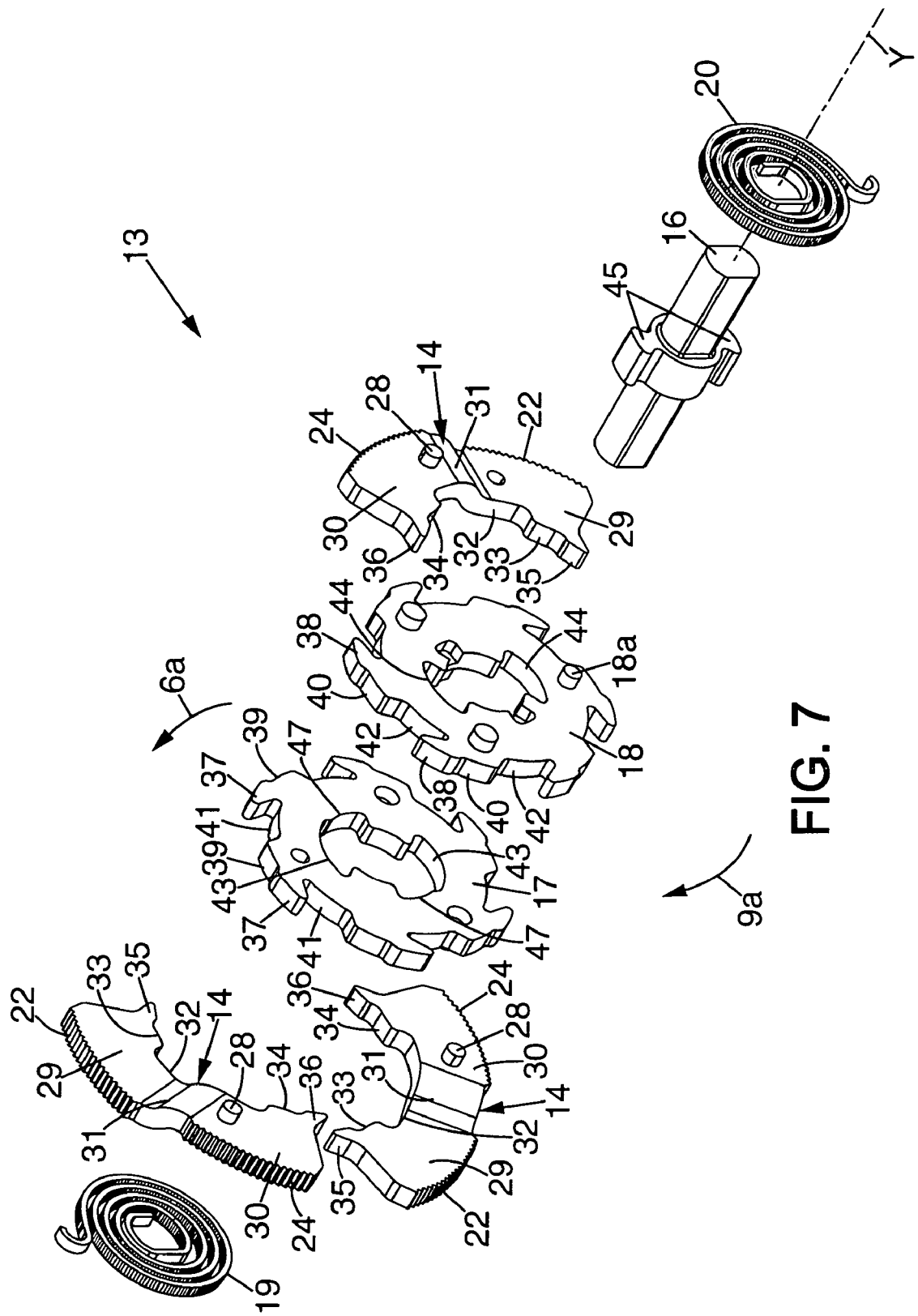
FIG. 7 is a view similar to FIG. 6, seen in the same direction as FIG. 5.

As can be seen in FIGS. 6 and 7, each of the slugs 14 can optionally be in the form of a folded and cut-out sheet metal plate comprising first and second flat portions 29, 30 disposed in respective ones of the planes of the first and second cams 17, 18 and carrying respective ones of the first and second locking shoes 22, 24, the second flat portion 30 further carrying the above-mentioned stud 28. The first and second flat portions 29 and 30 of each slug are further connected together by a fold 31.

In addition, on its radially innermost edge, each slug 14 can be provided with a central recess 32 flanked by two abutment surfaces 33, 34 that are part of respective ones of the flat portions 29, 30. The abutment surfaces 33, 34 are themselves flanked by two unlocking fingers 35, 36 that extend in slanting manner radially inwards and away from each other.

The first and second cams 17, 18 further have outer edges that are identical or similar to each other, but that extend in opposite angular directions. More particularly, the first cam 17 is provided with a series of hooks 37 that extend in slanting manner radially outwards and in the angular direction 6a. For example, there can be six of said hooks, distributed angularly at 60° from one another about the axis Y. The second cam 18 is provided with hooks 38 that are similar to the above-mentioned hooks 37 but that extend in the angular direction 9a.

In addition, each hook 37 of the first cam is associated with a cam surface 39 disposed immediately behind said hook in the angular direction 6a, each hook 37 being separated from the following cam surface 39, in the angular direction 6a by a recess 41 that extends radially inwards in the cam 17.

The second cam 18 also has cam surfaces 40 and recesses 42, each cam surface 40 being disposed immediately behind a hook 38 in the angular direction 9a and being separated from the preceding hook 38 (also in the angular direction 9a) by a recess 42.

The cam surfaces 39, 40 are adapted to come into abutment against respective ones of the abutment surfaces 33, 34 of the slugs so that the first and second locking shoes 22, 24 of said slugs come into engagement with respective ones of the first and second locking bearing surfaces 21, 23 when the hinge mechanism is in the rest position.

The hooks 37, 38 of the cams penetrate into the recesses 32 in the slugs, and the unlocking fingers 35, 36 of the slugs penetrate into respective ones of the recesses 41, 42 of the two cams.

Finally, the cams 17, 18 are internally provided with respective circularly arcuate recesses 43, 44 (see FIGS. 6 and 7) into which at least one actuating finger 45 penetrates simultaneously, said at least one actuating finger being secured to the shaft 16 and projecting radially outwards from said shaft 16. In the example shown in the drawings, the shaft 16 is provided with two actuating fingers 45, and each cam 18, 19 is provided with two circularly arcuate recesses, respectively 43 and 44. The recesses 43, 44 in the two cams are offset angularly relative to each other when the hinge mechanism is in the rest position, and they form a lost-motion connection with the actuating fingers 45.

The angular movement between the two cams 17, 18 is also limited by an additional connection that is independent of the actuating finger 45. In the example shown in the drawings, said additional connection is formed by at least one abutment stud 46 formed in the second cam 18 and projecting axially towards the first cam while penetrating into a circularly arcuate recess 47 in said first cam. More particularly, the second cam 18 can, for example, have two abutment studs 46 that are diametrically opposite each other about the axis Y and the first cam 17 is then provided with two corresponding circularly arcuate recesses 47, said circularly arcuate recesses communicating with the recesses 43 that receive the actuating fingers 45, but said recesses 47 have a radius that is slightly smaller than the radius of the recesses 43. The abutment studs 46 guarantee in particular that the two cams 17, 18 cannot be placed simultaneously in their releasing positions even if the seat is used incorrectly, so that the slugs 14 are always in engagement with at least one of the cheek plates 10, 11.

In the example considered herein, the locking shoes 22, 24 are disposed on the same circularly symmetrical cylindrical surface centered on the axis Y and defined by the pitch circle of the teeth constituting the locking shoes 22, 24.

Said cylindrical surface advantageously has a radius that is slightly smaller, e.g. in the range about 1% smaller to about 5% smaller, than the radius of the first and second locking bearing surfaces 21, 23 (also defined as the radius of the pitch circle of the teeth of the locking bearing surfaces 21, 23 in the example considered herein). It is thus possible for each slug 14 to be positioned as well as possible, by turning to a small extent in a plane perpendicular to the axis Y relative to the first and second locking bearing surfaces 21, 23. For example, this difference in radius can make it possible to allow each slug 14 to turn through an angle in the range 0.3° to 1° while also leaving its first and second locking shoes 22, 24 in engagement respectively with the first and with the second locking bearing surfaces 21, 23. When the locking bearing surfaces and the locking shoes are constituted by sets of teeth, this characteristic makes it possible, in particular, for the teeth to come into mutual engagement under the best possible conditions, by taking up any angular slack between the first and the second connection members, and by guaranteeing extremely strong locking between the first and the second connection members. Said locking is particularly strong since, when the hinge mechanism has to take up a particularly large amount of torque, e.g. when the vehicle in which the seat is installed is subjected to an impact, the slugs 14 work in shear so as to transmit the forces directly between the first and the second locking bearing surfaces 21, 23.

The above-described device operates as follows.

Figure 8:
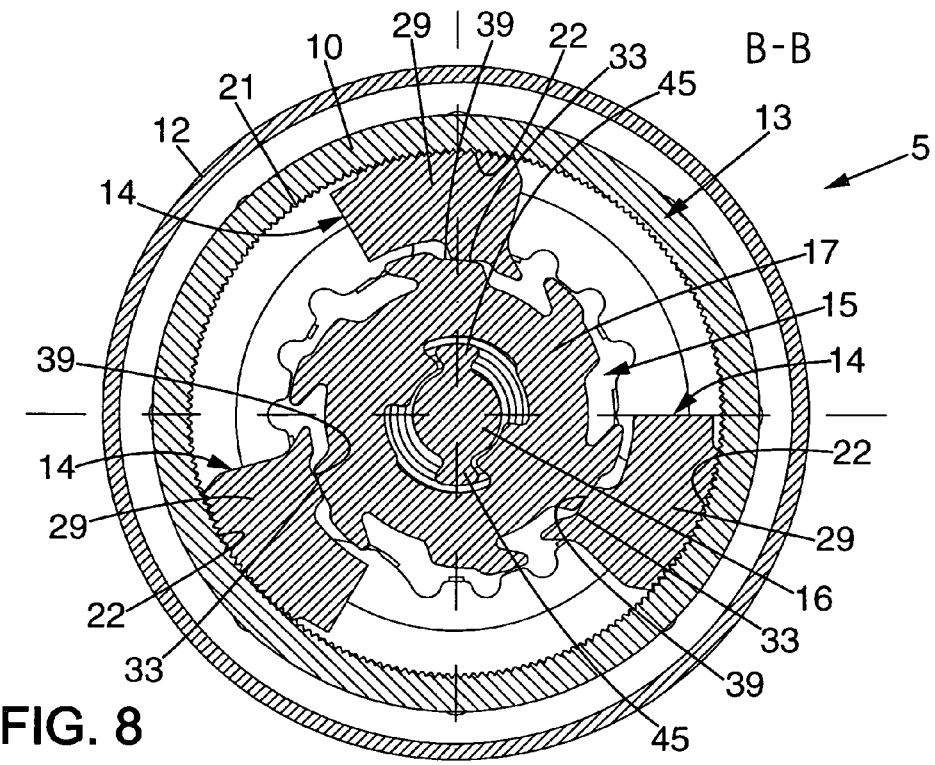
FIGS. 8 and 9 are views in section through the hinge mechanism of FIG. 3, respectively on line B-B and on line C-C of FIG. 3, when the hinge mechanism is locked.
Figure 9:
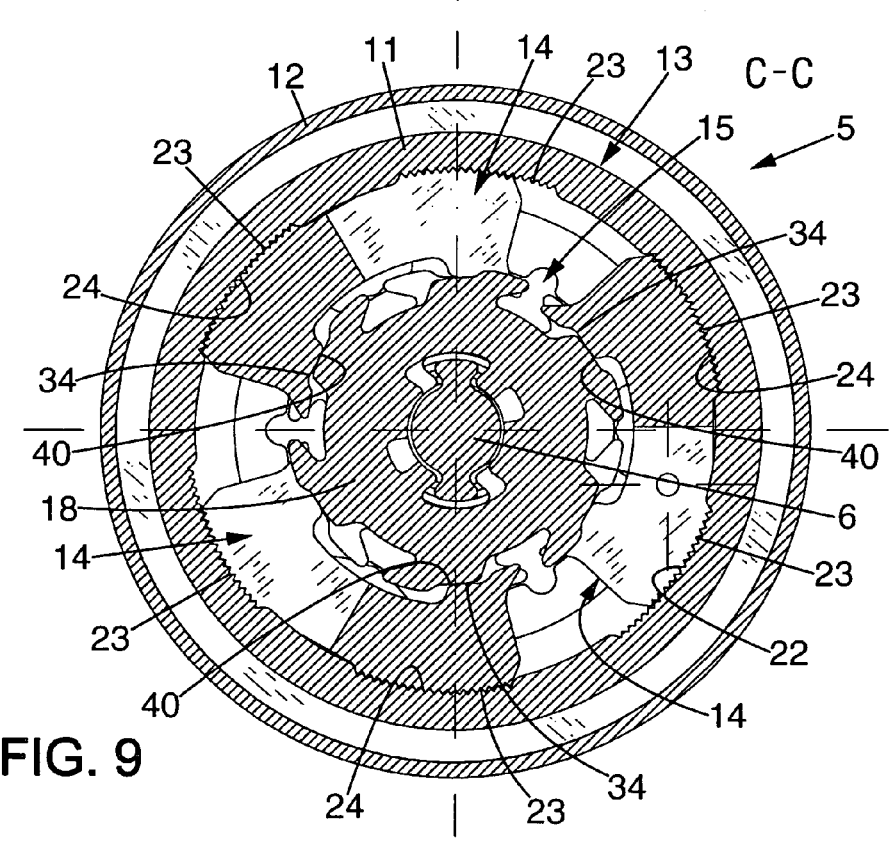

When the hinge mechanism is in the rest position, as shown in FIGS. 8 and 9, the first and the second locking shoes 22, 24 of each of the slugs are in engagement with respective ones of the first and second locking bearing surfaces 21, 23 that belong to respective ones of the first and second connection members 10, 11. The slugs are held in these positions by means of the cam surfaces 39, 40 of the first and second cams 17, 18 bearing against respective ones of the abutment surfaces 33, 34 of the slugs 14, the cams 17, 18 being held in their locking position which is shown in FIGS. 8 and 9 under resilient drive from the springs 19, 20.

Figure 10:
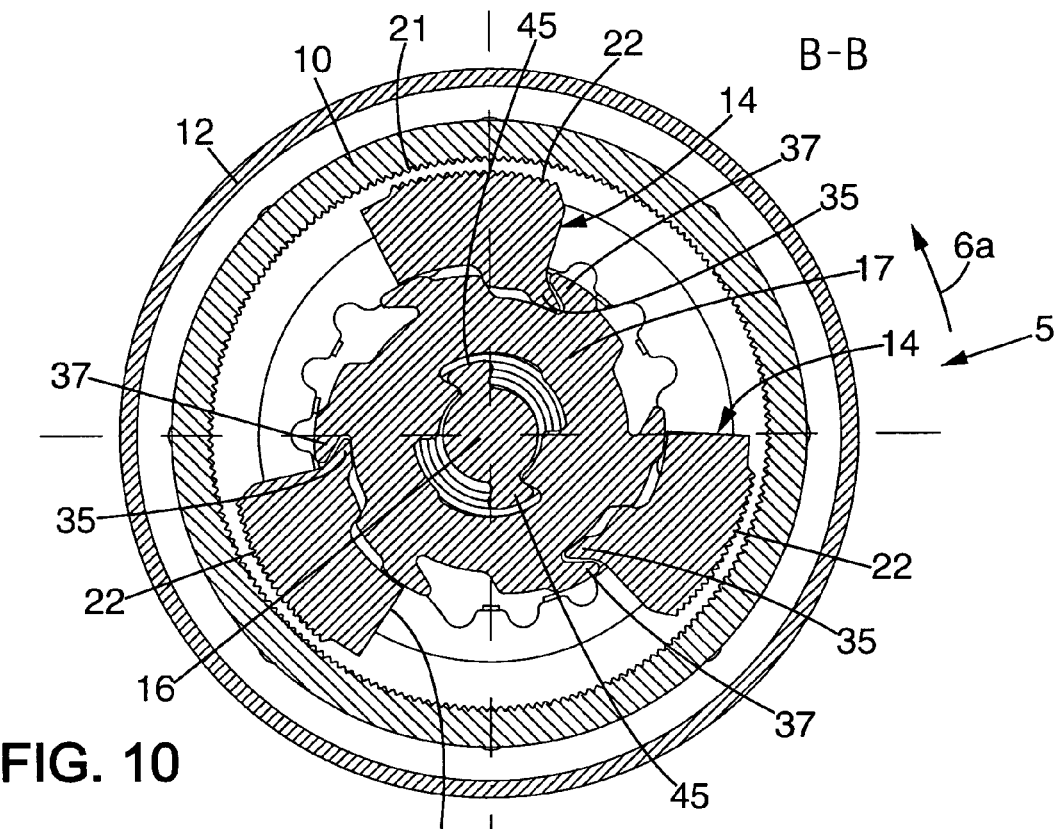
FIGS. 10 and 11 are views respectively similar to FIGS. 8 and 9, showing the hinge while the inclination of the seat back is being adjusted.
Figure 11:
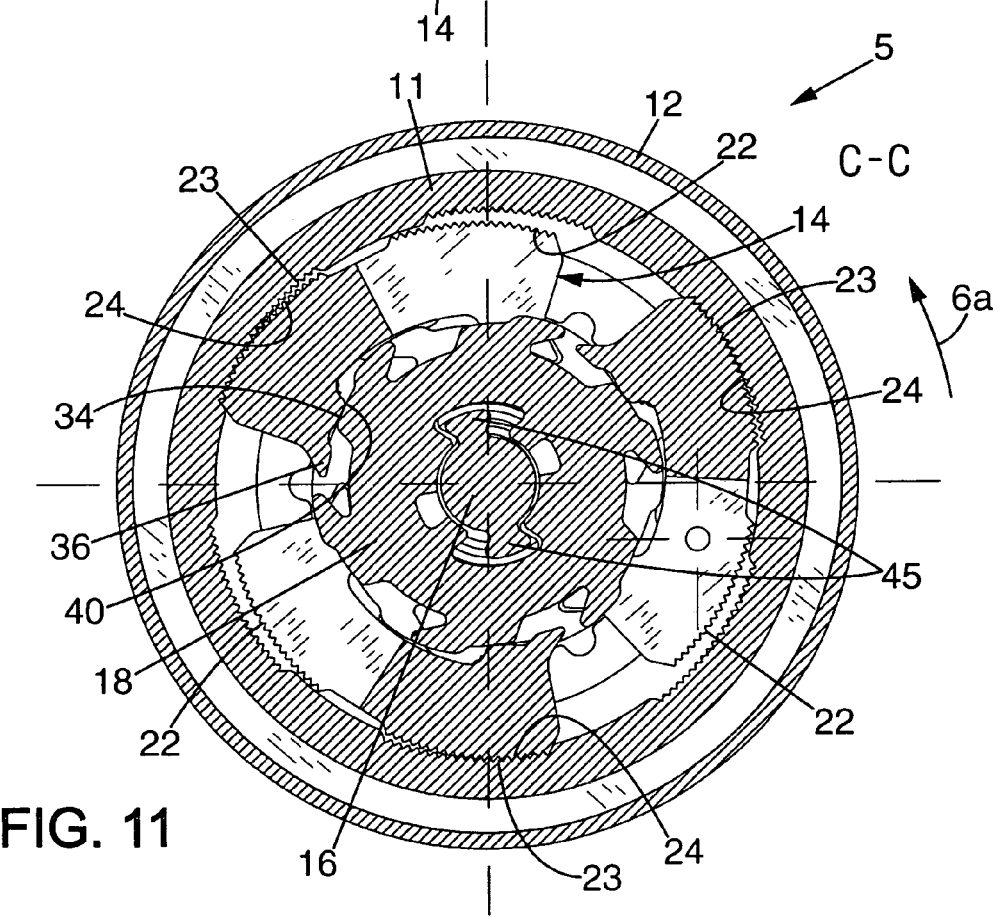

As shown in FIGS. 10 and 11, when a user wishes to adjust the inclination of the seat back 4, said user actuates the handle 6 in the angular direction 6a, so that the actuating fingers 45 come into abutment at one end of each of the recesses 43 in the first cam 17, thereby driving said first cam 17 into the releasing position in the angular direction 6a until the hooks 37 of said first cam (or, at least, three of said hooks) engage over the unlocking fingers 35 of the slugs 14, thereby causing said slugs 14 to pivot about their second locking shoes 24 which remain in engagement with the corresponding locking bearing surfaces 23. The slugs 14 thus reach a first retracted position in which their first locking shoes 22 do not interfere with the first locking bearing surface 21.

The circularly arcuate recesses in the first and second cams are offset angularly such that the actuating fingers 45 do not interfere with the second cam 18 during this movement, so that the cam surfaces 40 (more exactly, three of the cam surfaces 40 in the example considered herein) remain in abutment against the abutment surfaces 34 of the slugs 14, while guaranteeing that the second locking shoes 24 remain in engagement with the second locking bearing surfaces 23.

The pivoting movement of the slugs 14 is made easier by the fact that the first and second locking shoes 22, 24 have a radius in the vicinity of the radius of the first and second locking bearings surfaces, or equal to said radius of the bearing surfaces 21, 23. Advantageously, the radius of the bearing surfaces 22, 24 can be slightly smaller than the radius of the bearing surfaces 21, 23. The above-mentioned movement is also made easier by the shapes of the angular ends of the shoes 14, which angular ends are adapted to avoid any interference between the slugs 14 and the connection members 10, 11 while the slug 14 is pivoting around one or other of said ends.

When the hinge mechanism is in the position shown in FIGS. 10 and 11, i.e. with its first cam 17 in the releasing position and its second cam 18 in the locking position, the seat back 4 of the seat can be inclined manually by the user, generally by acting against resilient drive that tends to cause the seat back 4 to pivot forwards.

Optionally, it is possible to guarantee that the cam 17 is in the releasing position whenever the cheek plate 10 is not in a predefined angular position relative to the cheek plate 11. To this end, it is possible, for example, for the inside face of the cheek plate 10 to be provided with a circular guide face 50 in the form a circular arc (FIG. 5) that extends angularly on either side of a larger-diameter zone 51. One of the slugs 14 is provided with an axially projecting stud 52 (FIG. 6) which is situated in the zone 51 when the cheek plate 10 is in the angular zone in which the cam 17 can come into its locking position and in which the slugs 14 can lock onto the set of teeth 21 on the cheek plate 10.

Conversely, when the stud 52 is in register with the guide surface 50, said guide surface prevents the first locking shoes 22 from locking onto the set of teeth 21 and the cam 17 is thus held in the normal releasing position. In this position, the abutment studs 46 prevent the cam 17 from being offset relative to its releasing position. Such an offset could give rise to tooth scuffing noises while the cheek plates 10, 11 are pivoting relative to each other.

Figure 12:
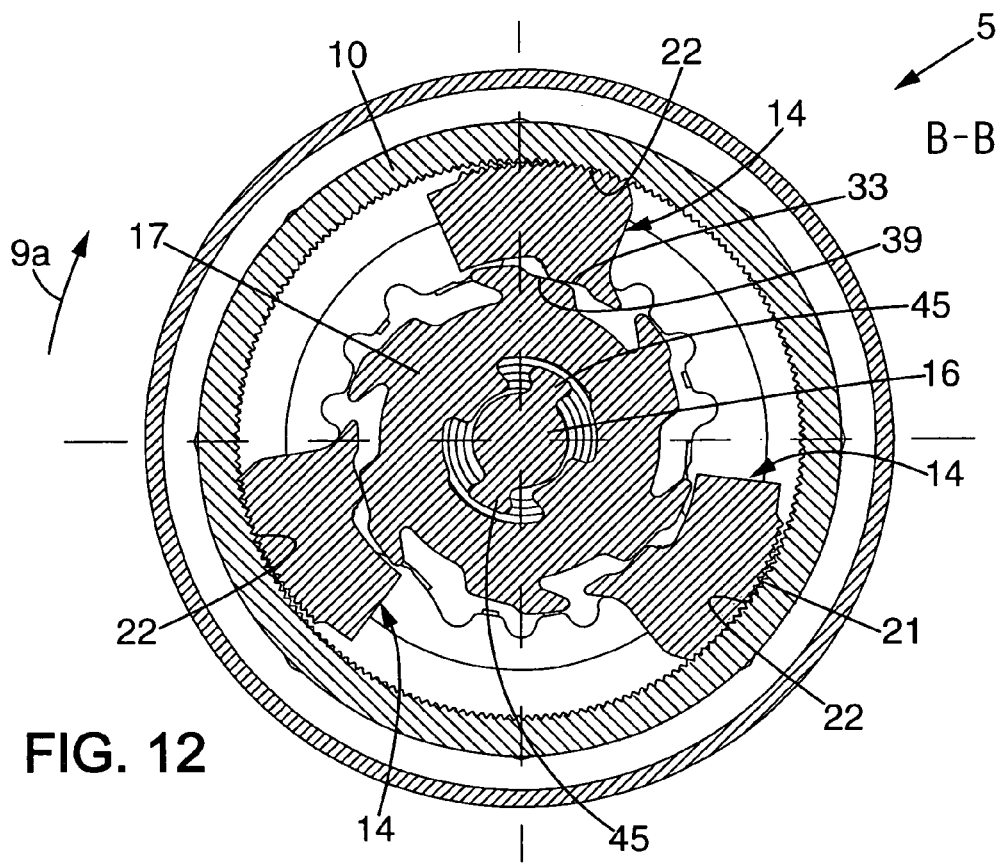
FIGS. 12 and 13 are views respectively similar to FIGS. 8 and 9, while the seat back is being folded down forwards for the purpose of offering easier access to the space situated behind the seat.
Figure 13:
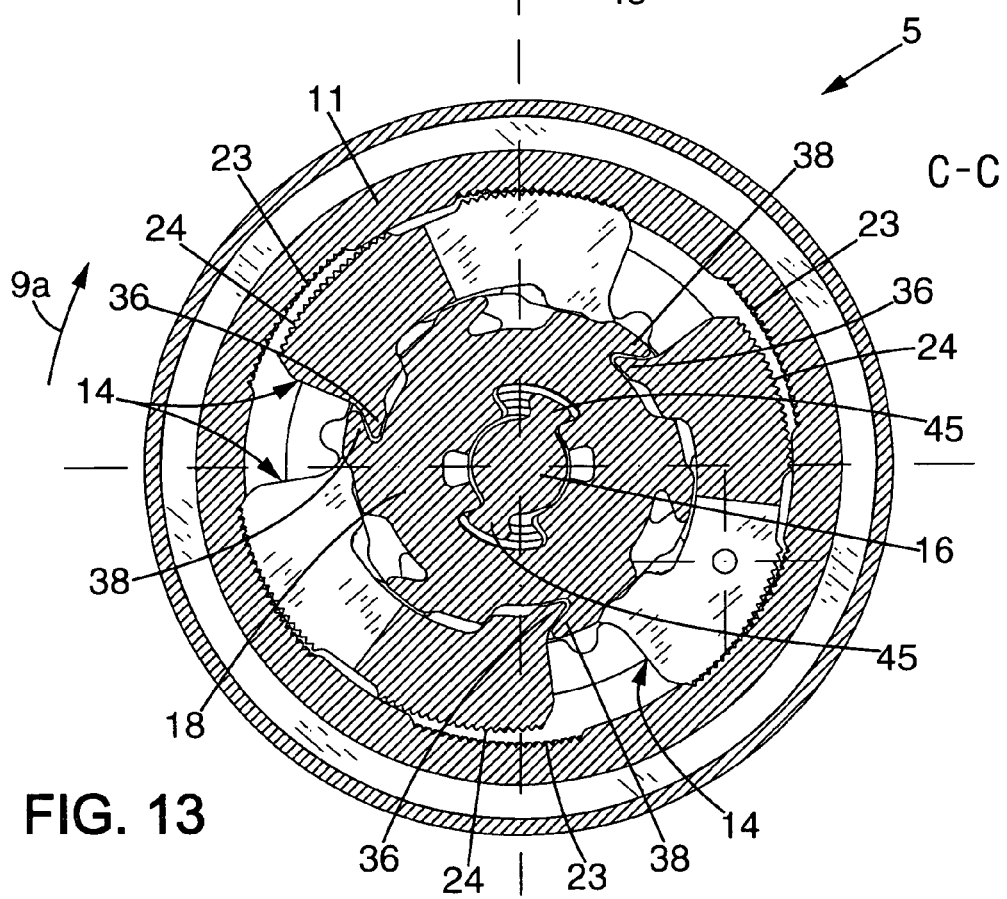
Figure 14:
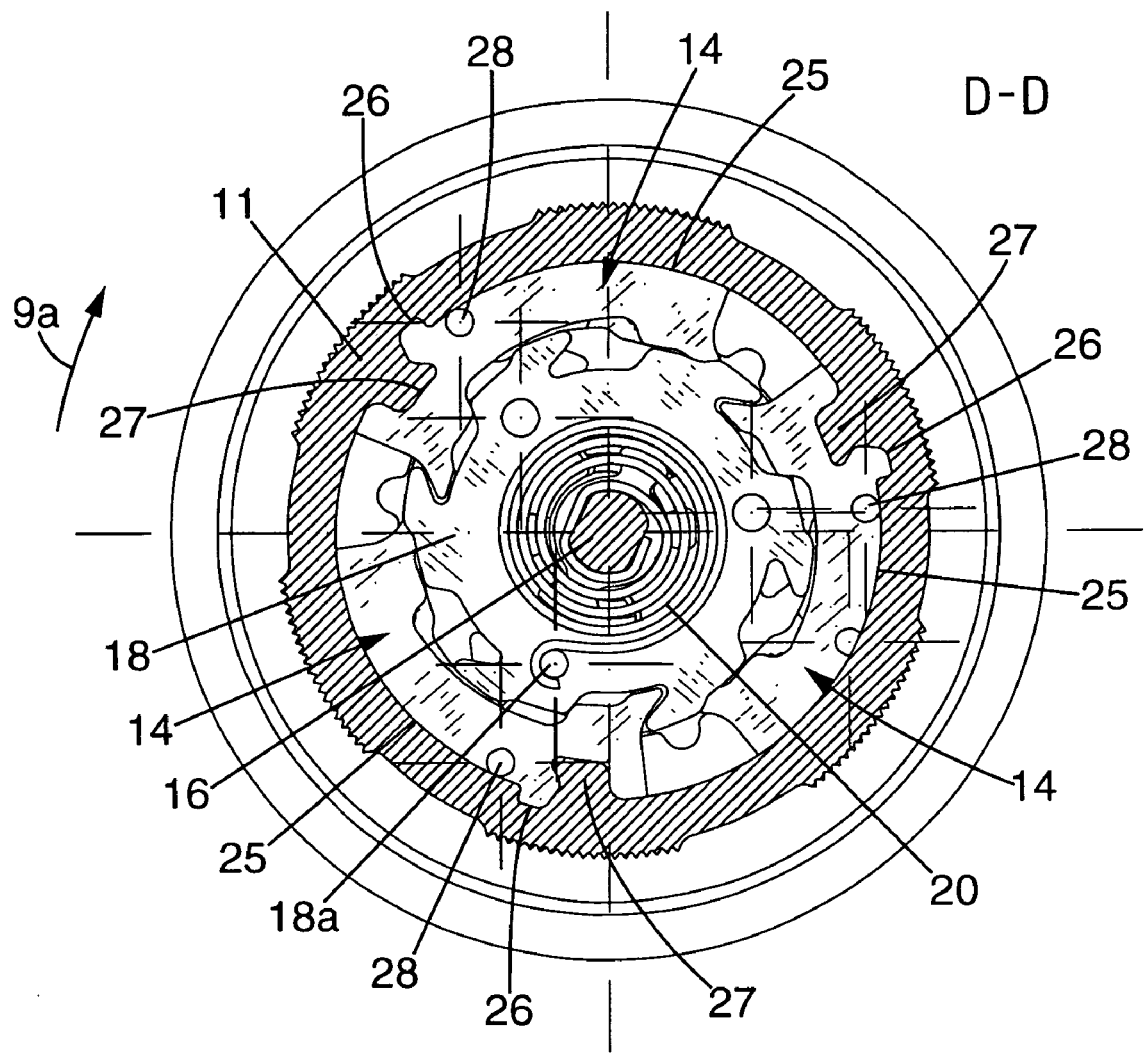
FIG. 14 is a section view on line D-D of FIG. 3, in the position shown in FIGS. 12 and 13.
Figure 15:
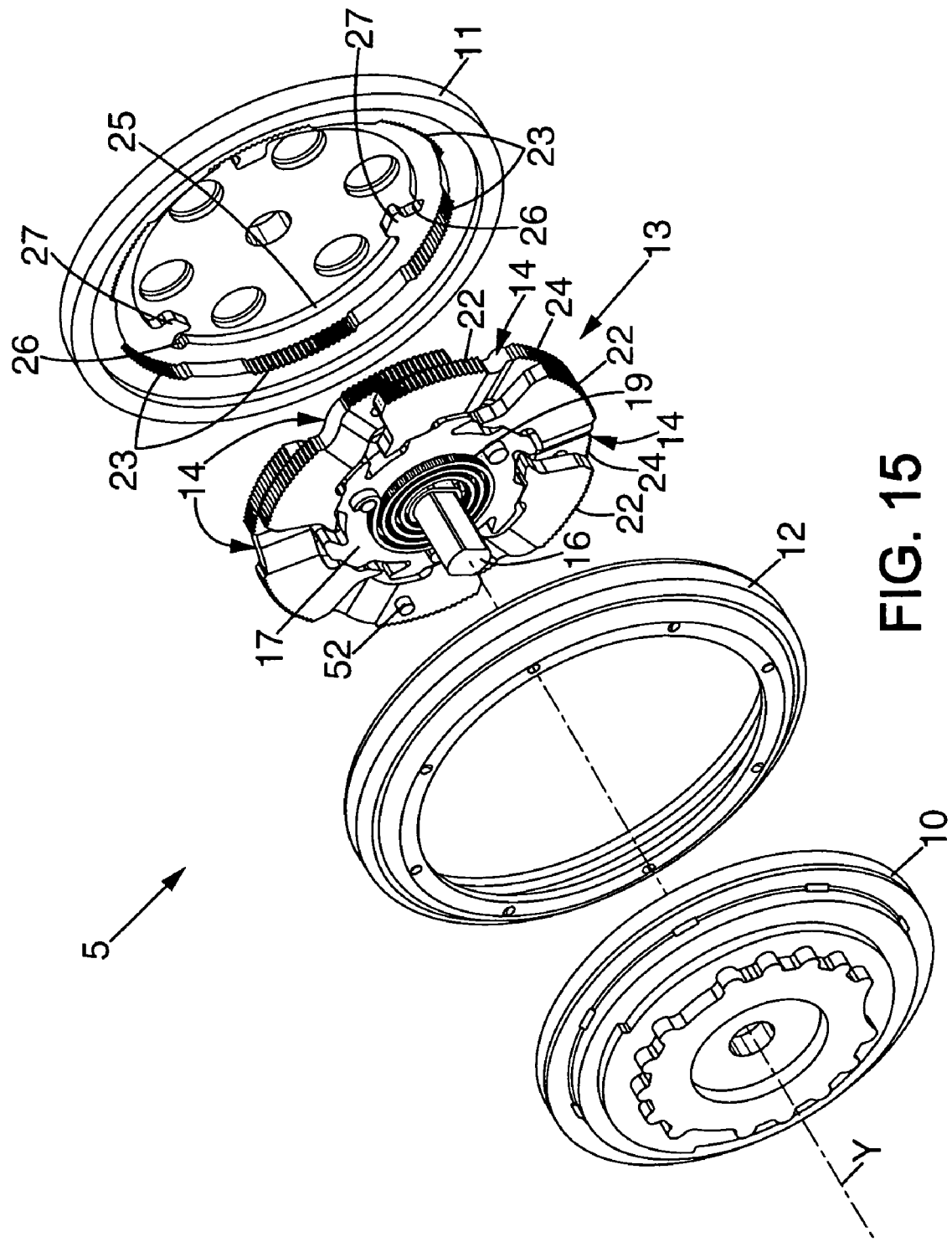
FIGS. 15 to 24 are views respectively similar to FIGS. 4 to 13, in a variant of the first embodiment of the invention.
Figure 16:
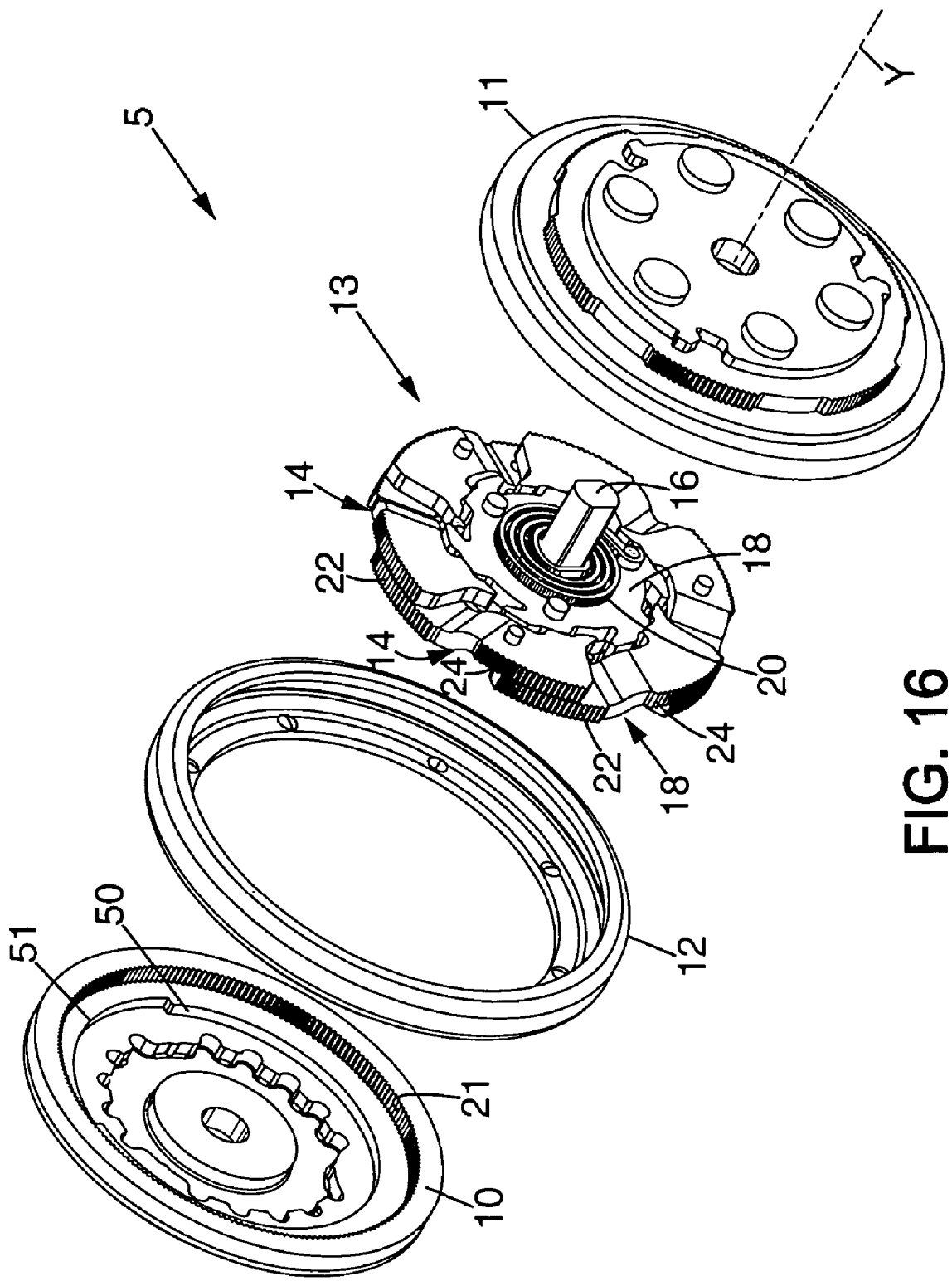
Figure 17:
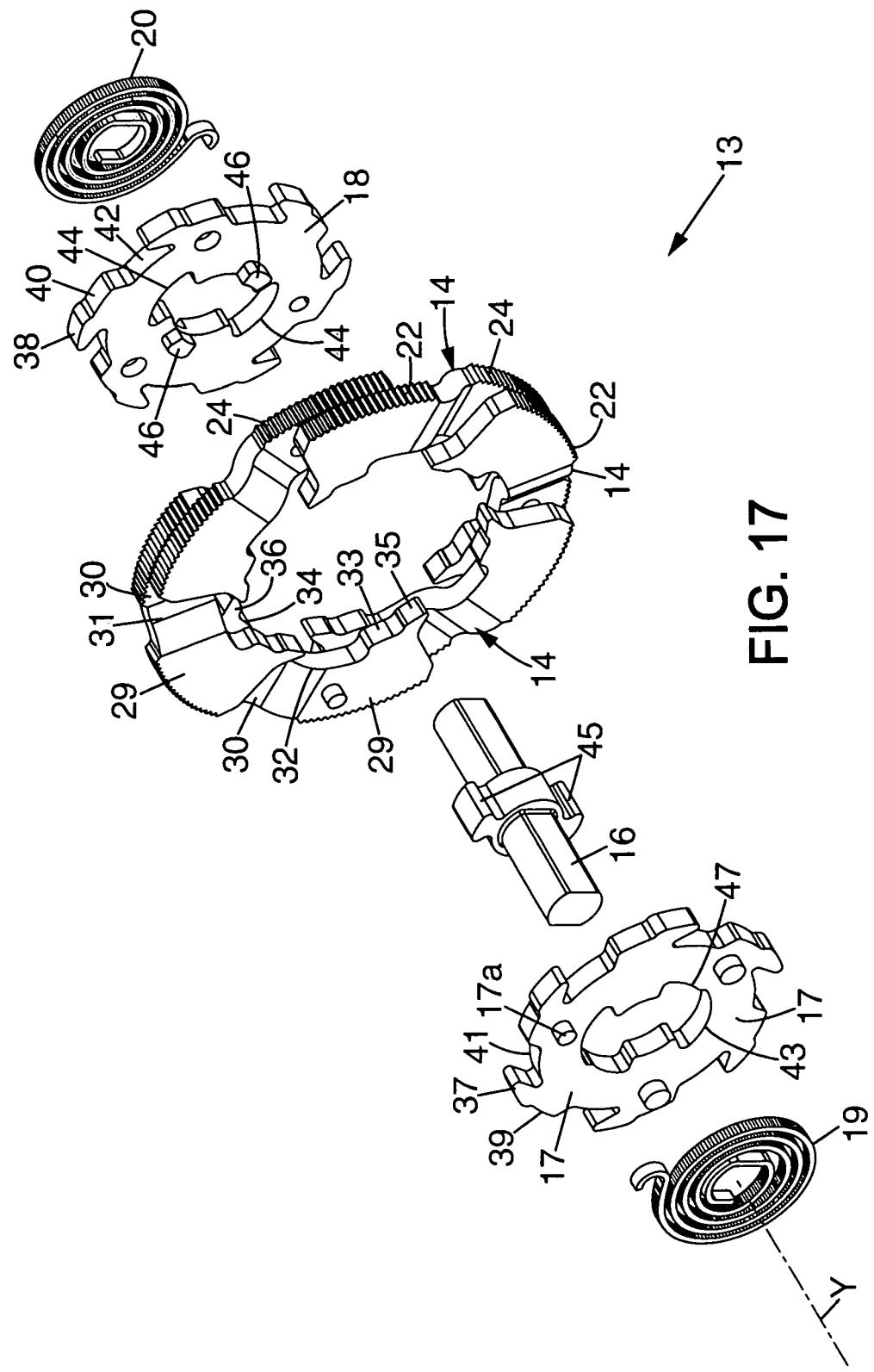
Figure 18:
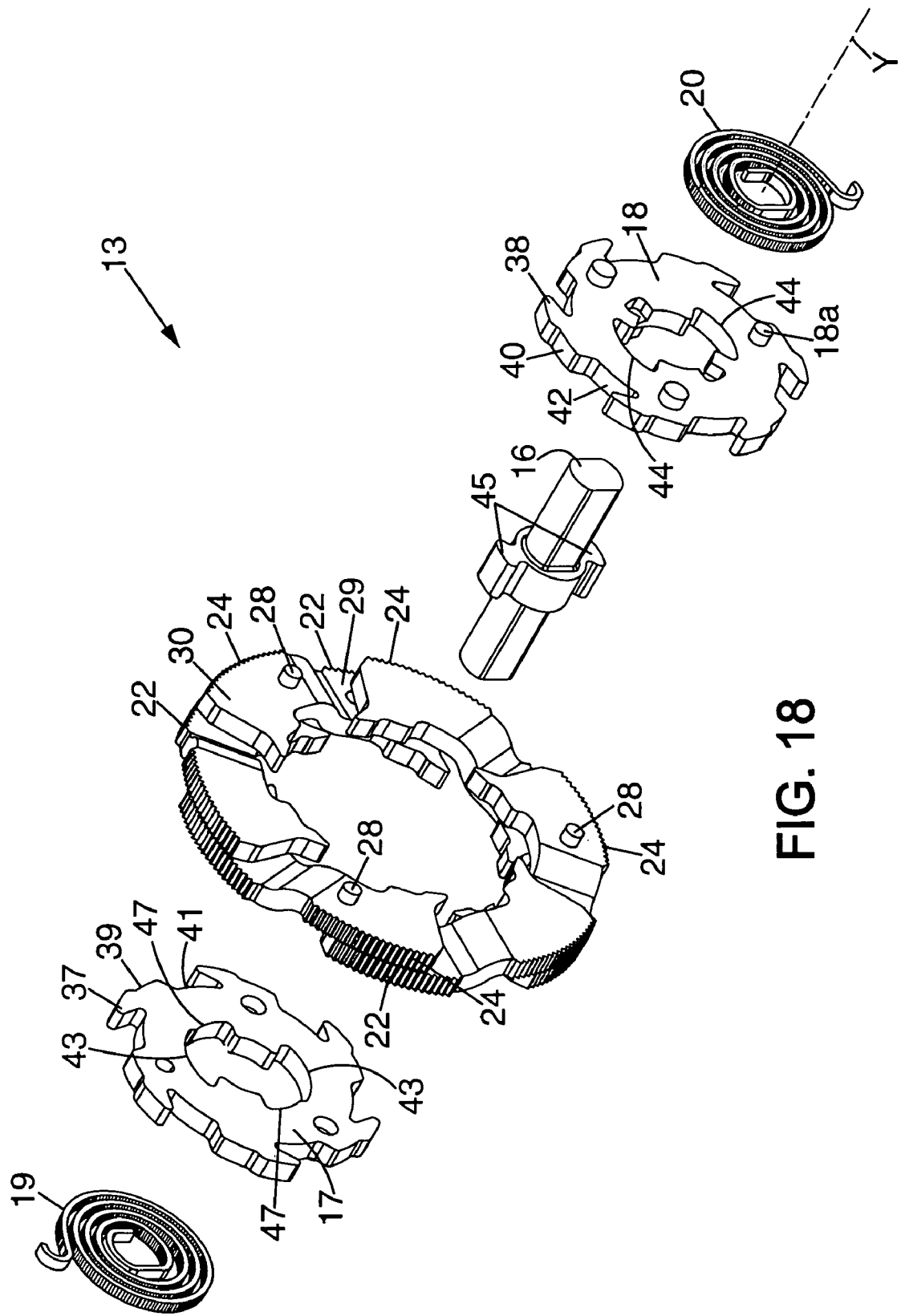

In addition, when a user wishes to access the space situated behind the seat 1, said user can fold the seat back 4 down fully forwards, by actuating the handle 7 shown in FIG. 1, which causes the lever 9 and the shaft 16 to pivot in the angular direction 9a as shown in FIGS. 12 to 14.

During this movement, the actuating fingers 45 of the shaft 16 do not interfere with the first cam 17, because of the angular offset between the recesses 43, 44 so that the first cam 17 remains in its locking position and holds the first locking shoes 22 in engagement with the first locking bearing surface 21 (FIG. 12).

Conversely, as can be seen in FIG. 13, the hooks 38 on the second cam (or more exactly three of the hooks 38) engage over the unlocking fingers 36 of the slugs 14, thereby causing the slugs 14 to pivot about their first locking shoes 22. Said slugs 14 thus go into the second retracted position shown in FIG. 13, in which the second locking shoes 24 no longer interfere with the two locking bearing surfaces 23.

In addition, during this movement, as can be seen in FIG. 14, the studs 28 of the slugs disengage from the notches 26 in the second connection member 11 and, as soon as the seat back starts folding down forwards, said studs 28 come into abutment against the guide surfaces 25, thereby preventing the second locking shoes 24 of the slugs from coming back into engagement with the first locking bearing surfaces. While the seat back is being folded down forwards, the studs 28 remain in abutment against the guide surfaces 25 while the control device 15 as a whole pivots with the slugs 14 and with the first connection member 10 about the axis Y, with the seat back 4.

When the user wishes to put the seat back 4 of the seat up again after it has been folded down forwards, this movement results in the slugs 14 being moved angularly in the angular direction opposite to the direction 9a, until the studs 28 come up against the abutments 27 that define the latching position in which the slugs 14 are latched relative to the second connection member 11. The studs 28 then engage in the notches 26, thereby making it possible for the second locking shoes 24, of the slugs 14 to return into engagement with the second locking bearing surfaces 23.

It should be noted that, when the studs 28 come up against the abutments 27, the slugs 14 are braced against the first locking bearing surface 21, so that there is no risk of the first locking shoe 22 of each slug coming unlatched.

It is thus guaranteed that the seat back 4 of the seat is re-locked exactly in the same angular position as the angular position it occupied before the handle 7 was actuated.

At the end of re-locking, the slugs self-position themselves because of the small amount of clearance allowed between the slugs 14 and their respective cams and locking bearing surfaces. This small amount of clearance corresponds to the slugs pivoting to a small extent, through at least 0.3 degrees, in a plane perpendicular to the pivot axis Y. The locking shoes 22, 24 are thus properly locked with their corresponding locking bearing surfaces 21, 23.

In the variant shown in FIGS. 15 to 18, the first and second connection members 10, 11, the crimped ring 12 and the control device 14 are identical to those described above, and they are not therefore described again below.

In this variant, the hinge mechanism differs from the above-described hinge mechanism by the fact that it has three additional slugs 14 that are identical to the above-mentioned slugs 14 except that they do not have studs 28.

Figure 19:
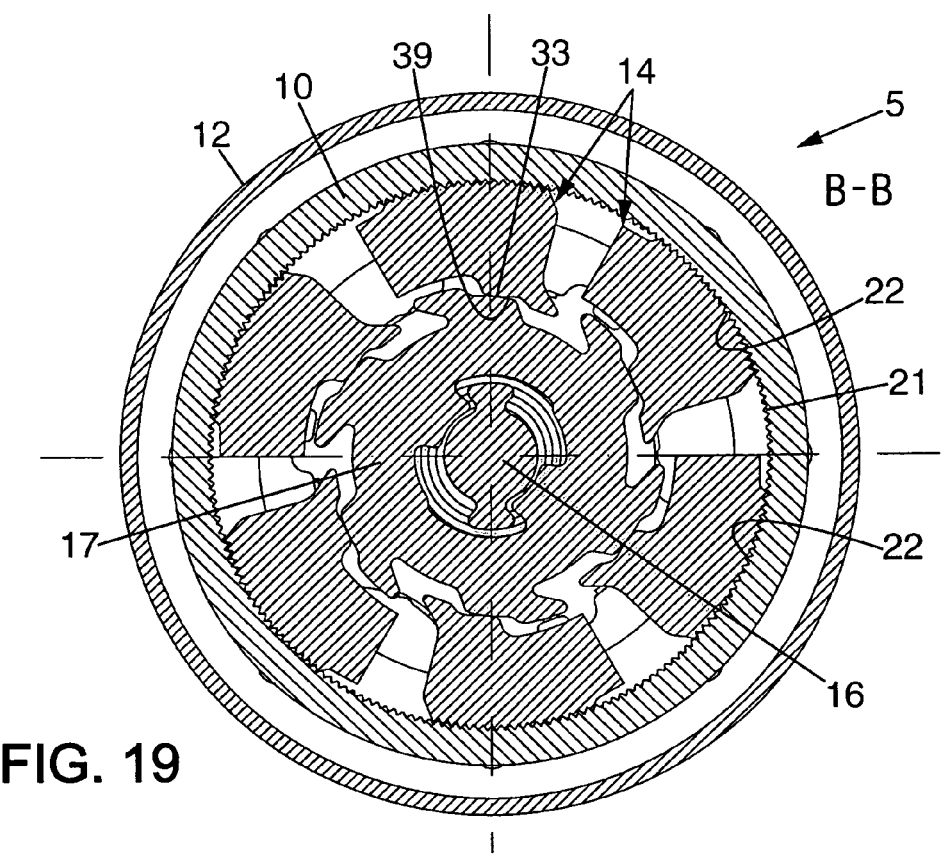
Figure 20:
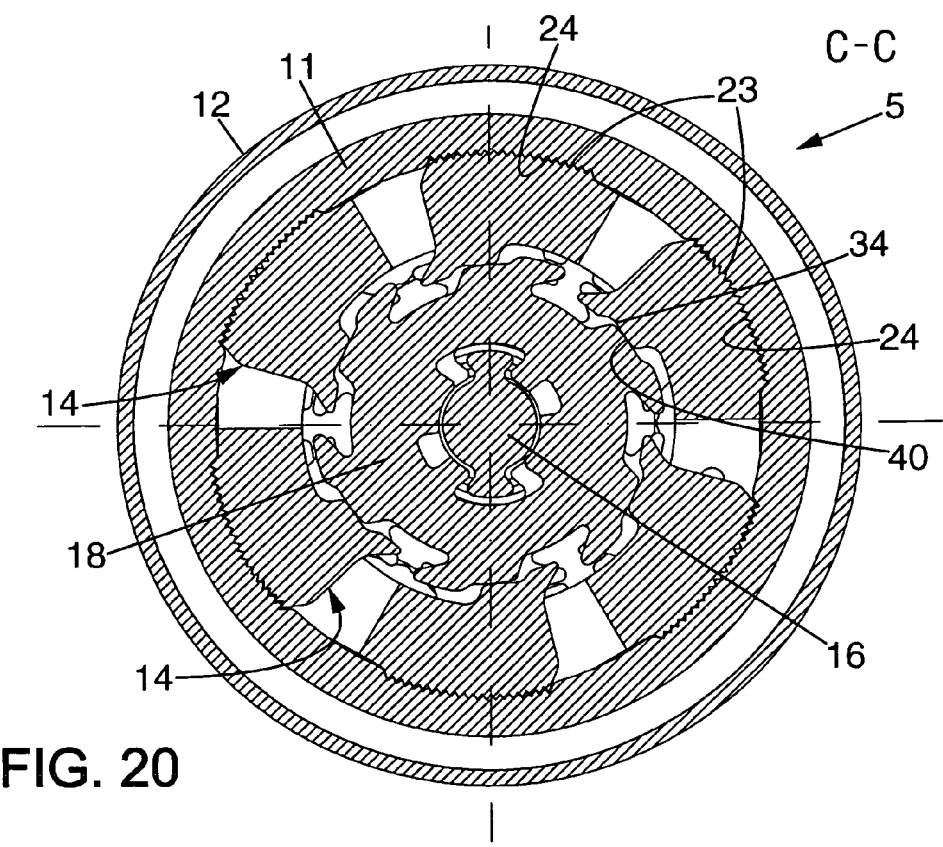

In this variant, each of the slugs 14 has two flat portions 29, 30 disposed in distinct planes, and advantageous use is made of this by superposing the first and the second flat portions 29, 30 of two adjacent slugs at least in part. When the first and second cams 17, 18 are in the locking position, as shown in FIGS. 19 and 20, the six cam surfaces 39, 40 are in respective abutment against the abutment surfaces 32, 34 of the six slugs. In this position, locking of exceptional strength is obtained between the first and second connection members 10, 11.

Figure 21:
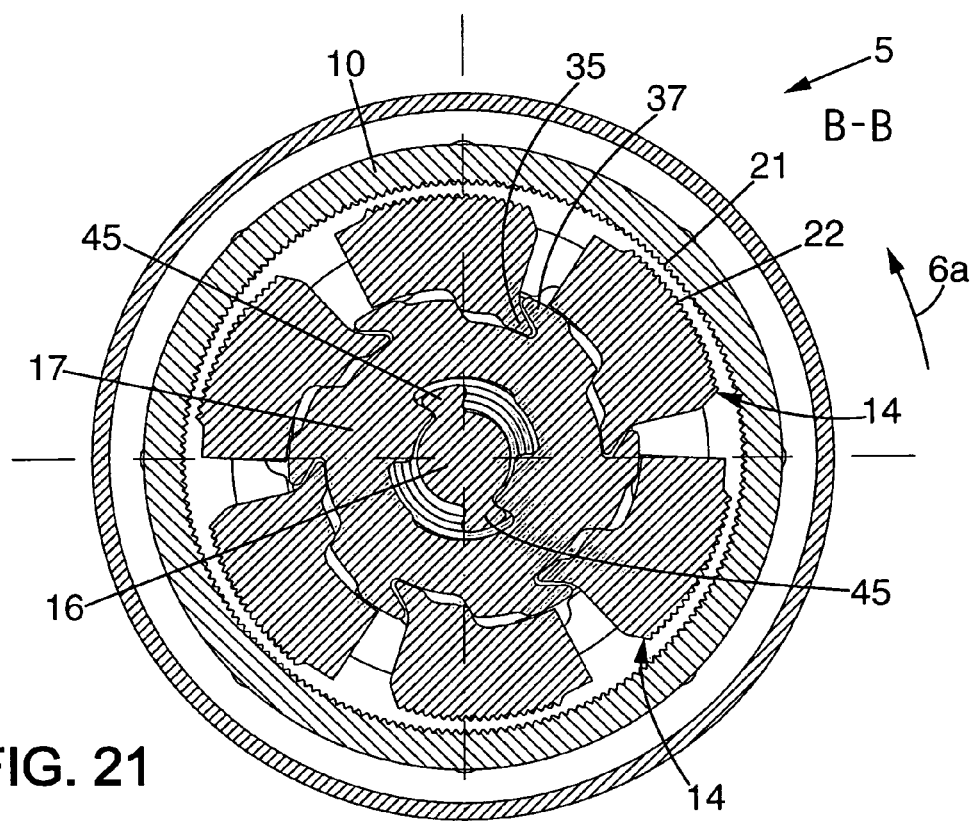
Figure 22:
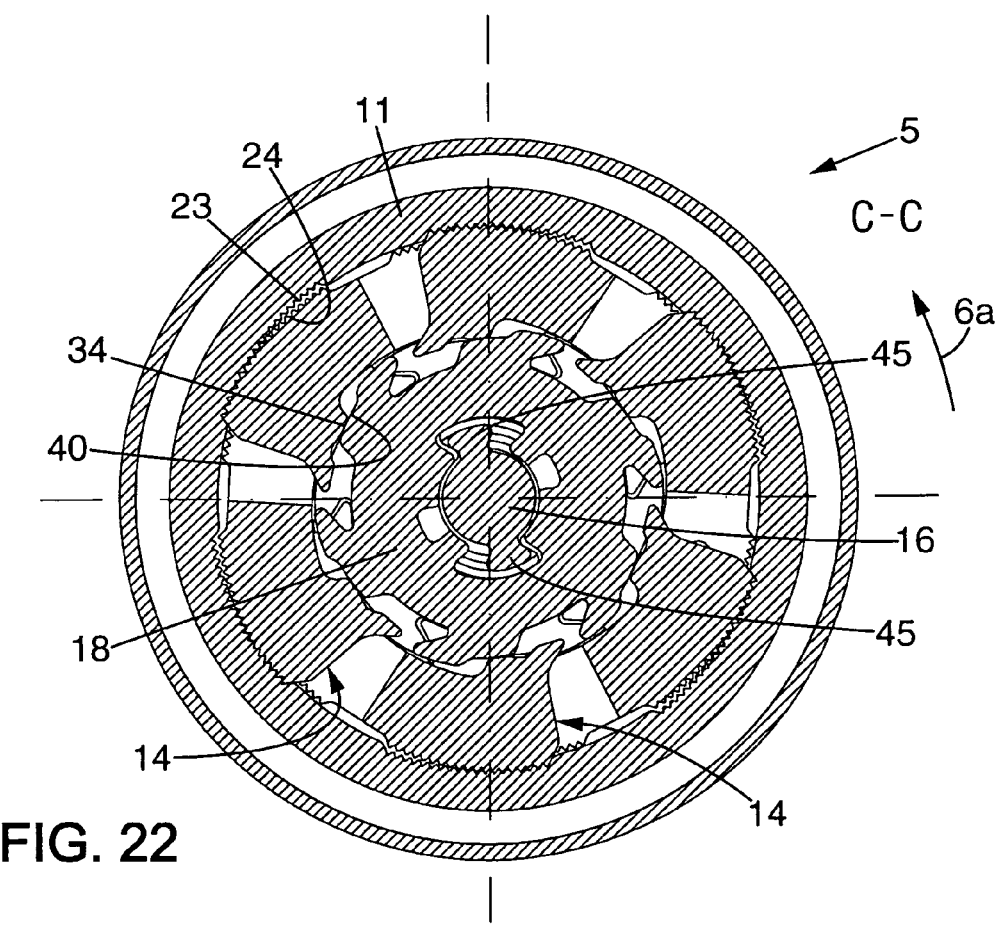

Furthermore, as shown in FIGS. 21 and 22, when a user actuates the handle 6 in the angular direction 6a, the six hooks 37 of the first cam 17 engage over the six unlocking fingers 35 of the slugs 14, so that the six slugs move into their first retracted position in which their first locking shoe 22 no longer interferes with the first locking bearing surfaces 21 (see FIG. 21).

As shown in FIG. 22, the cam surfaces 40 of the second cam then remain in abutment against the abutment surfaces 34 of the slugs while holding the second shoes 24 of the slugs in engagement with the second locking bearing surfaces 23.

Figure 23:
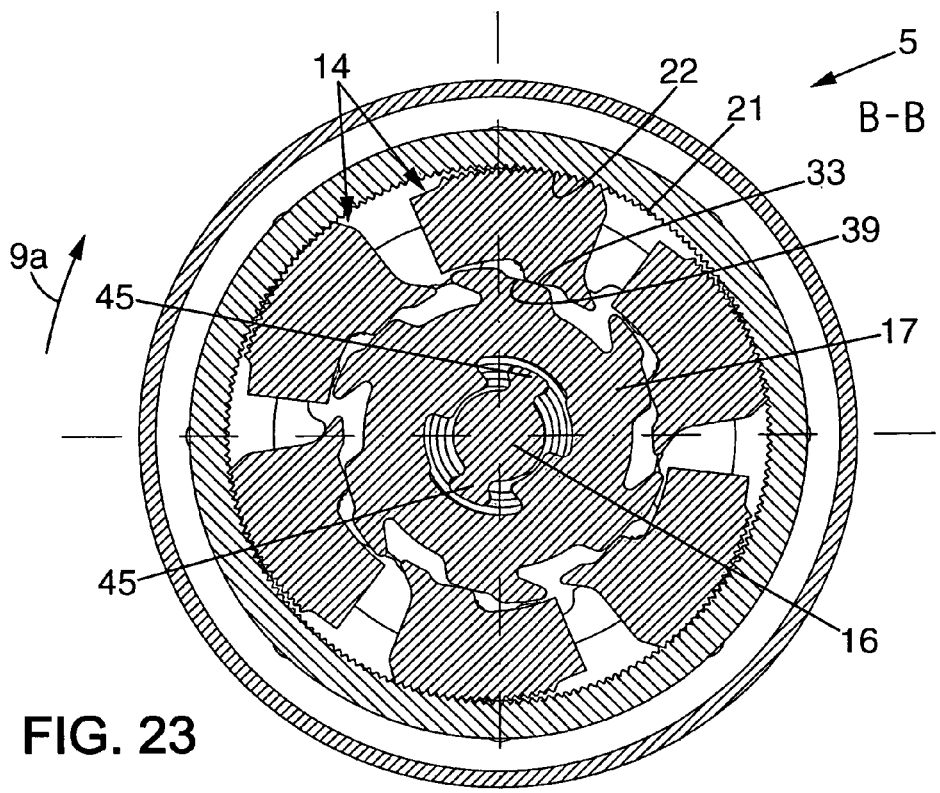
Figure 24:
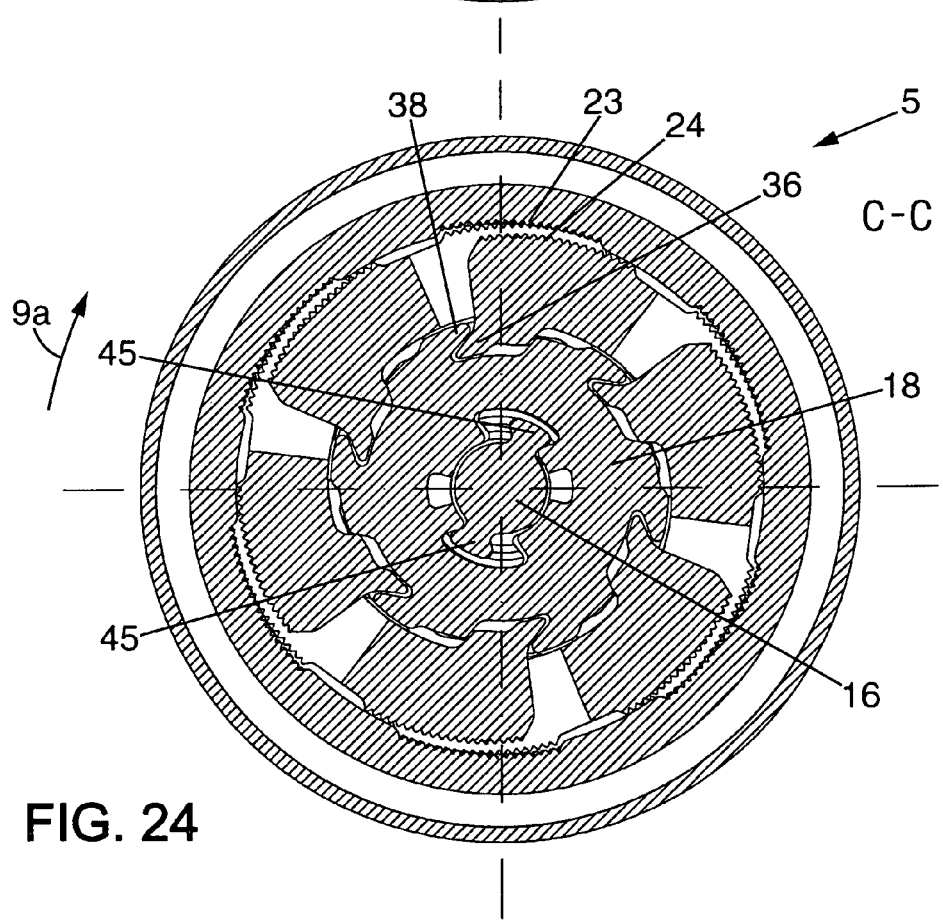
Figure 25:
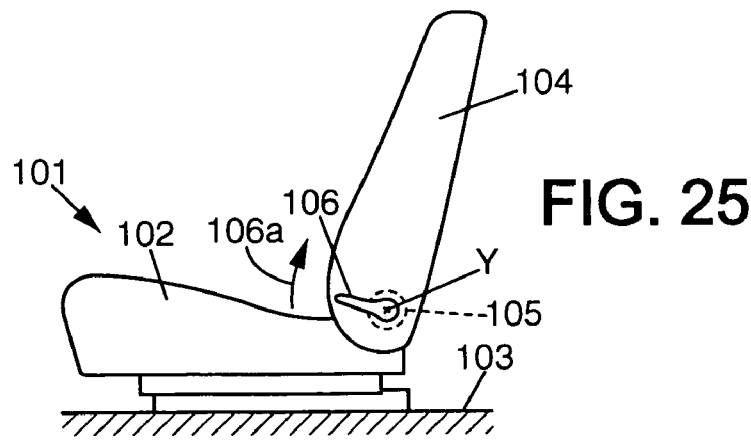
FIG. 25 is a diagrammatic view of a vehicle seat in a second embodiment of the invention.

In addition, as shown in FIGS. 23 and 24, when the handle 7 is actuated, the first cam 17 remains stationary while holding the first locking shoes 22 in engagement with the first locking bearing surface 21, whereas the hooks 38 of the second cam 18 engage over the unlocking fingers 36 of the six slugs 14, so that the slugs 14 pivot about their first unlocking shoes 22 until they reach their second retracted position in which the second locking shoes 24 do not interfere with the second locking bearing surfaces 23. During the ensuing pivoting movement of seat back 4, only those three slugs 14 which have studs 28 co-operate with the guide surface 25, but said three slugs hold the second cam 18 in the unlocked position, so that all of the slugs 14 remain in their second retracted positions so long as the seat back 4 has not been put back up to its previously-set angular position.

In the second embodiment of the invention, shown in FIGS. 25 to 35, the seat 101 also comprises a seat proper 102 carried by the floor 103 of the vehicle, and a seat back 104 which is mounted to pivot about the pivot axis Y by means of a hinge mechanism 105. The hinge mechanism is adapted to selectively locking or releasing the seat back 104 in rotation about the seat back 102, and it is controlled by a handle 106 that can be actuated in an angular direction 106a.

Figure 26:
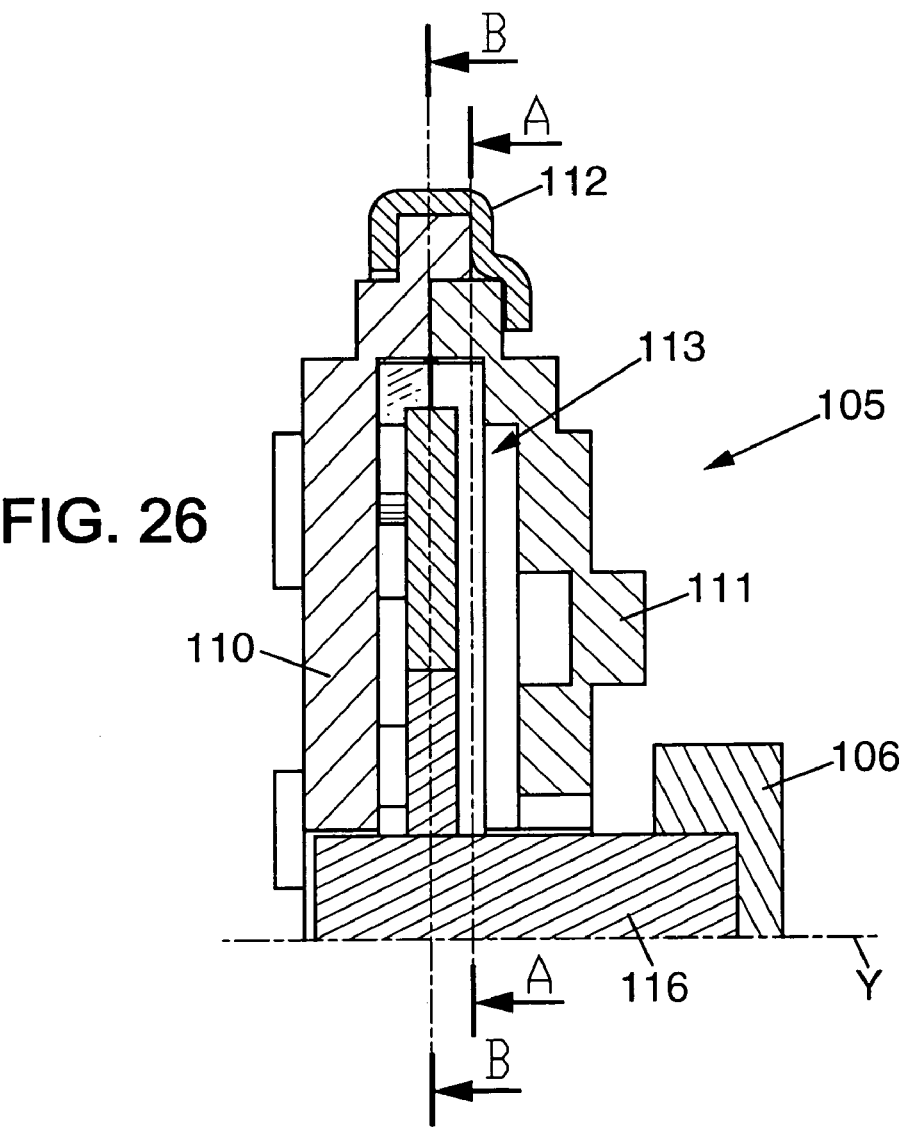
FIG. 26 is an axial section view similar to FIG. 3, in the second embodiment of the invention.

As shown in FIG. 26, the hinge mechanism 105 comprises, for example:

- a first rigid connection member 110, e.g. a metal cheek plate that is in the general shape of a disk centered on the pivot axis Y, said first connection member being fastened, for example, to the framework of the seat back 104;
- a second rigid connection member 111, e.g. a metal cheek plate that is in the general shape of a disk centered on the axis Y, said second connection member being fastened, for example, to the framework of the seat proper 102;
- a metal ring 112 crimped around the peripheries of the first and second connection members 110, 111 while enabling said connection members to move relative to each other about the axis Y (the crimped ring 112 could however be replaced with any other means making it possible to hold the two connection members 110, 111 against each other while leaving them free to pivot about the axis Y); and
- a locking device 113 adapted selectively to lock or to release the two connection members 110, 111 in relative rotation about the axis Y.

Figure 27:
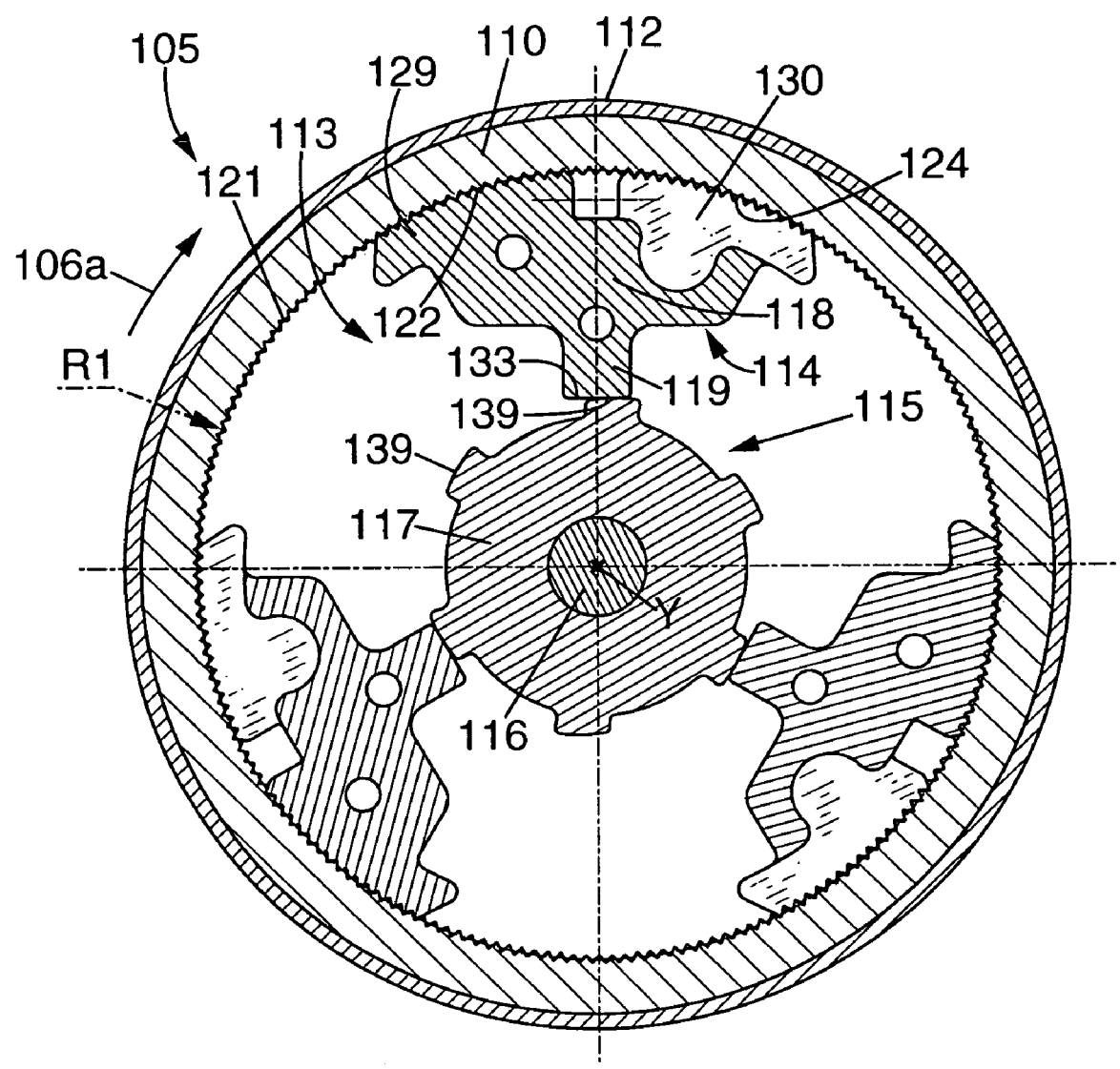
FIGS. 27 and 28 are views in section respectively on line A-A and on line B-B of FIG. 26, when the hinge mechanism is in the locked position.
Figure 28:
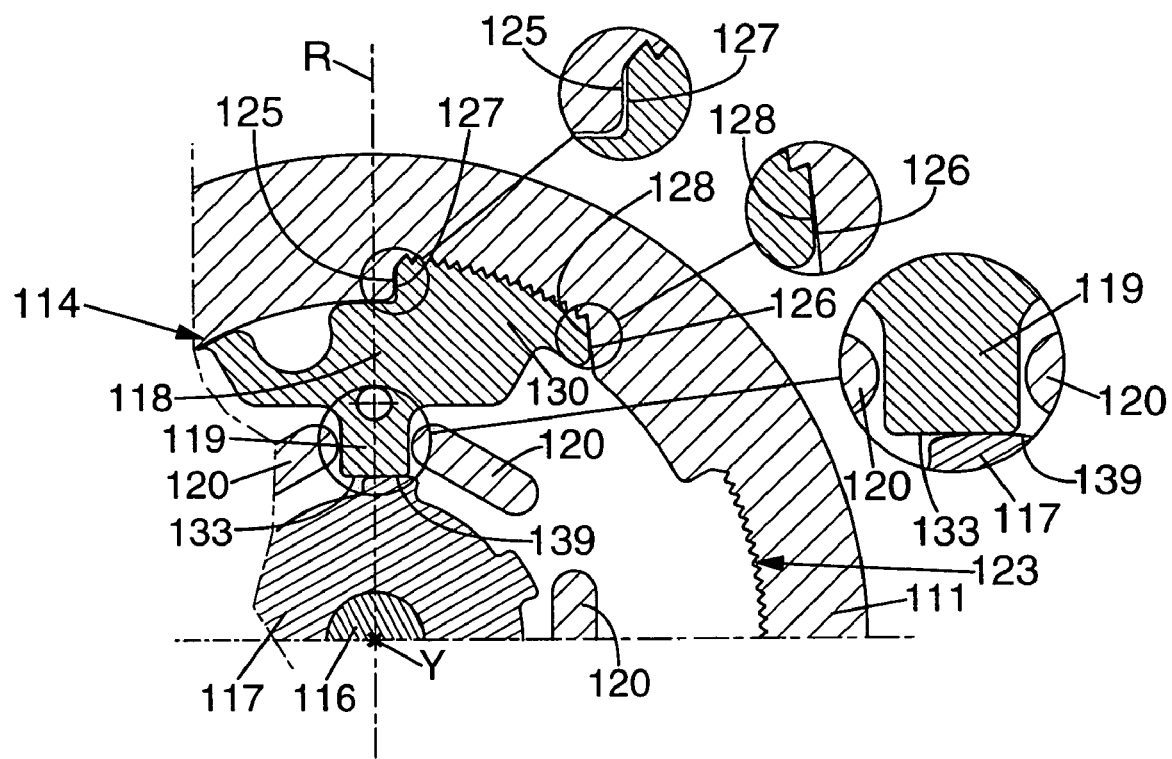

As shown in FIGS. 27 and 28, the locking device 113 comprises at least one rigid slug 114, e.g. three slugs 114 distributed angularly at 120° from one another about the axis Y.

The slugs 114 are controlled by a control device 115 which, in the example shown, comprises:

- a rigid central shaft 116 which is secured to the handle 106; and
- a cam 117 which can, for example, be in the form of a cut-out sheet metal plate secured to the shaft 116 and extending in a plane perpendicular to the pivot axis Y.

On its outside periphery, the cam 117 has at least one cam surface 139 that projects radially outwards. In the example shown herein, the cam 117 has six cam surfaces 139, three of which come into abutment against respective ones of the abutment surfaces 133 of the slugs 114 so as to move the slugs 114 radially outwards.

The cam 117 is urged resiliently into its locking position shown in FIGS. 27 and 28, e.g. by means of a spiral spring (not shown), the inner portion of which can be secured to the shaft 116 (e.g. by the inner portion of the spring engaging by being fitted against a flat portion of the shaft 116) and the inner end of which is fastened to a portion of the second connection device 112.

The slug 114 can be in the form of a cut-out and stamped piece of sheet metal comprising:

- a body 118;
- a tail 119 extending the body 118 radially inwards and having said abutment surface 133;
- a first flat portion 129 extending in a first plane perpendicular to the axis Y and carrying a first locking shoe 122 facing radially outwards, said first locking shoe being adapted to come into engagement with a first circular locking bearing surface (forming a full circle or a circular arc) facing inwards and integral with the first connection member 110;
- a second flat portion 130 which extends parallel to the first flat portion 129 but offset angularly relative thereto, the second flat portion 130 extending in a second radial plane distinct from the first plane, without any axial overlap between the first and second flat portions 129, 130, and the second flat portion 130 carrying a second locking shoe 124 that faces radially outwards and that is adapted to come into engagement with a second circular locking bearing surface 123 (more particularly in the shape of a circular arc) facing radially inwards and integral with the second connection member 111.

The second connection member 111 can be provided with three second locking bearing surfaces 123, or optionally with six second locking bearing surfaces, thereby making it possible to receive six slugs in the hinge mechanism, only three of the second locking bearing surfaces 123 being used when the hinge mechanism includes only three slugs 114, as in the example shown. The locking bearing surfaces 123 are immediately adjacent to the locking bearing surface 121 along the axis Y.

As shown in FIG. 28, each slug 114 is guided as it slides in the radial direction R that passes through the tail 119 of said slug, by:

- pieces in relief 120 formed in the second connection member 111, said pieces in relief 120 flanking the tail 119 of the slug with clearance, it being possible, for example, for said pieces in relief 120 to be in the form of two ribs per slug, converging towards each other going radially outwards, and disposed symmetrically about the direction R; and
- two guide surfaces 125, 126 extending parallel to the direction R and provided in the second connection member 111, said two guide surfaces coming to face the two end edges 127, 128 of the second flat portion 130 of the slug.

The guide surfaces 125, 126 and the end edges 127, 128 are shaped to provide a certain amount of angular clearance for the slug 114 in a plane perpendicular to the axis Y.

In addition, the first and second annular bearing surfaces 121, 123 can have the same radius R1 centered on the axis Y, while the first and second locking shoes 122, 124 can have the same second radius R2 that is slightly smaller, e.g. by an amount in the range 1% to 5%, relative to the radius R1, so as to enable the above-mentioned pivoting movement of the slug to take place.

When the locking bearing surfaces 121, 123 and the first and second locking shoes 122, 124 are constituted by sets of teeth, the radius R1 is the radius of the pitch circle of the sets of teeth forming the locking bearing surfaces 121, 123, and the radius R2 is the radius of the pitch circle of the sets of teeth forming the first and second locking shoes 122, 124.

The slug 114 self-positions on the first and second locking bearing surfaces 121, 123, with the slug being able to pivot through a small amplitude, e.g. an angle in the range 0.3° to 1°, in particular about 0.5°.

This self-positioning of the slug guarantees that the first and second locking shoes 122, 124 come exactly into engagement with the first and second locking bearing surfaces when the cam 117 is in the locking position, thereby guaranteeing that the strength of the hinge mechanism is maximized in terms of withstanding large pivot stresses, such as those that take place when the vehicle in which the seat 101 is installed is subjected to an impact.

The above-described device operates as follows:

When the handle 106 is actuated in the direction 106a, it drives with it the cam 117, so that the slugs 114 can move radially inwards, as shown in FIGS. 32 and 33. The user of the seat can then adjust the inclination of the seat back by acting manually thereon.

It should be noted that the slugs 114 can be moved radially inwards:

- either merely by co-operation between the first bearing surface 121 and the first locking shoe 122 of the slug, e.g. by a camming effect of the sets of teeth carried by these elements;

or by resilient means driving the slugs radially inwards;

or else by using a control plate (not shown) equipped with cutouts co-operating by a camming effect with projecting studs 131 provided on the slugs, e.g. using the principles described in Document FR-A-2 740 406 (also using the principles described in that document, the first connection member 110 can, in certain angular ranges, optionally have guide surfaces that co-operate with additional studs 132 on the slugs, so as to prevent the first locking stud 122 from coming into engagement with the first locking bearing surface 121 in said angular ranges).

Figure 34:
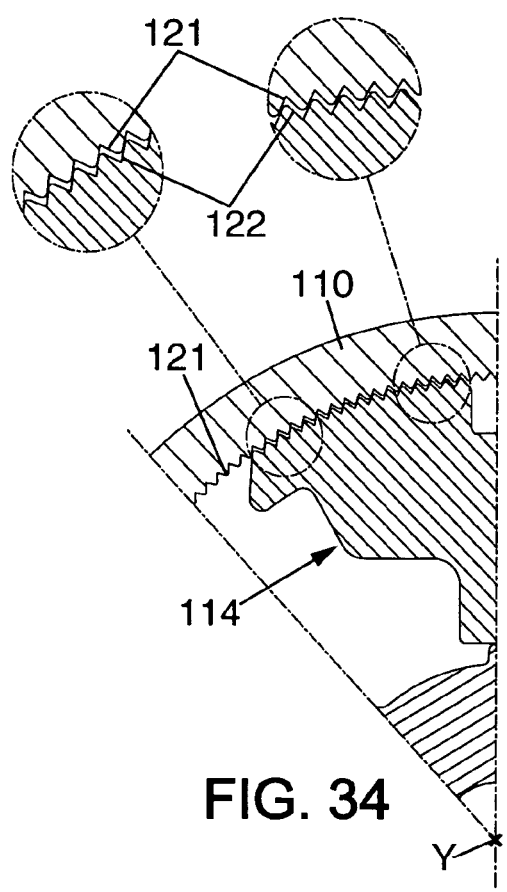
FIGS. 34 and 35 are views respectively similar to FIGS. 32 and 33, showing the slug when it returns into engagement at the end of adjustment of the inclination of the seat back.
Figure 35:
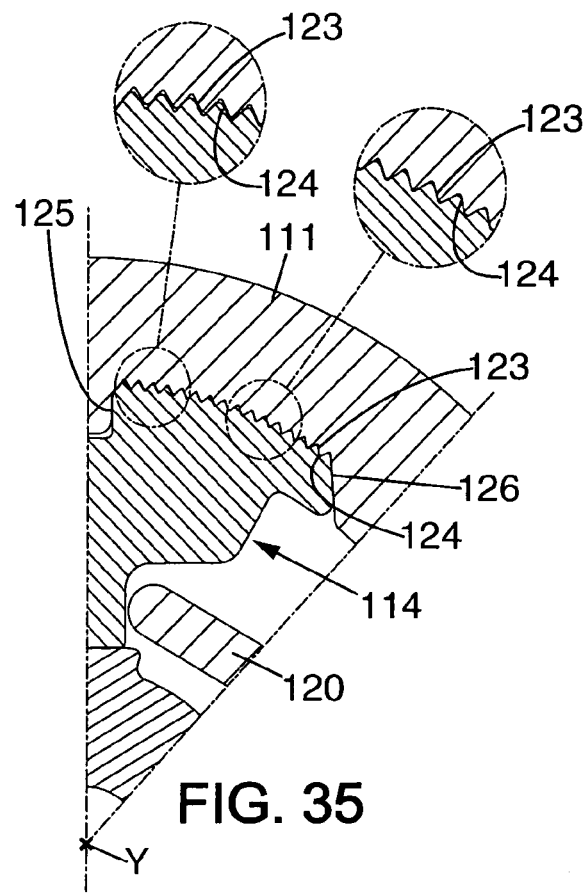

As shown in FIGS. 34 and 35, when the user releases the handle 106 after actuating it, one of the locking shoes 122, 124 starts by coming fully into engagement with the corresponding locking bearing surface 121, 123, while the other locking shoe, i.e. the locking shoe 122 in this example, is not fully in engagement with the corresponding locking bearing surface 121. However, by means of the slug 114 being able to pivot slightly, said slug self-positions itself and moves angularly until the first locking shoe 122 comes fully into engagement with the first locking bearing surface 121, while the second locking shoe 124 remains in engagement with the second locking bearing surface 123, which guarantees that the first and second connection members are locked together snugly and very strongly.

Figure 36:
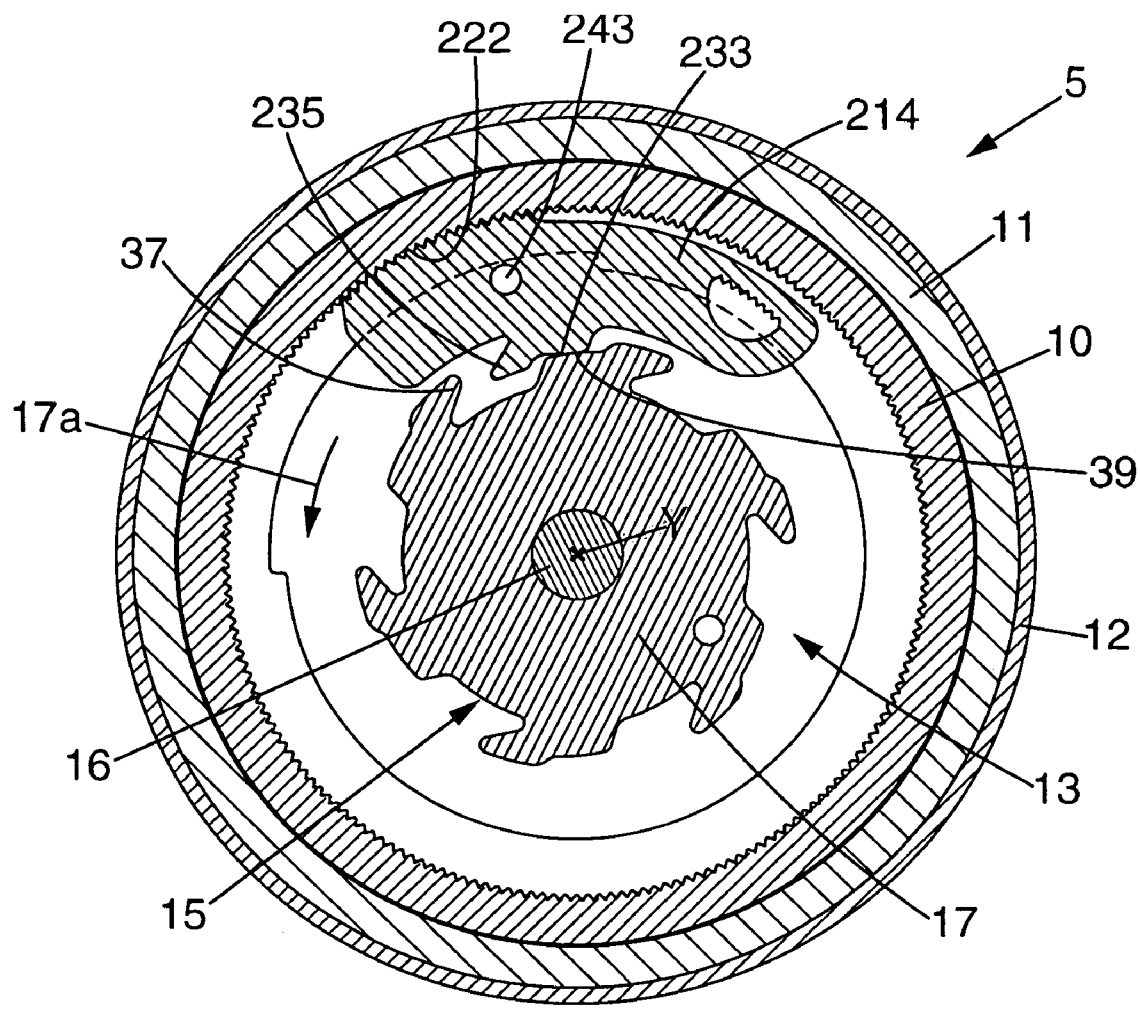
FIG. 36 is a vertical section view of a hinge mechanism in a third embodiment of the invention.
Figure 37:
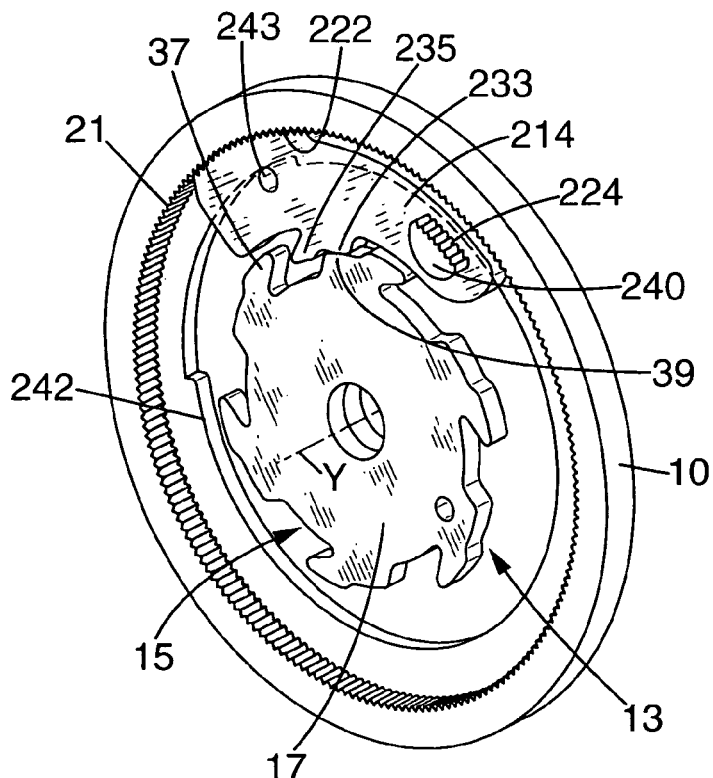
FIG. 37 is a view inside the mechanism of FIG. 36 without its stationary cheek plate or its crimped metal ring.
Figure 38:
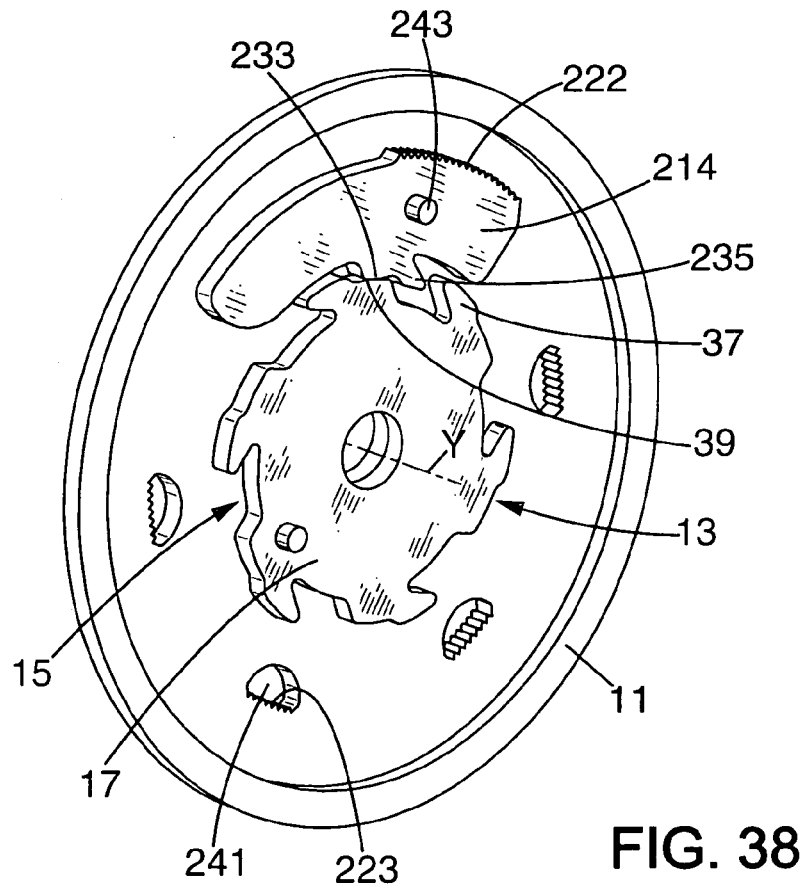
FIG. 38 is a view inside the stationary cheek plate of the mechanism of FIG. 36.

In the third embodiment of the invention shown in FIGS. 36 to 38, the hinge mechanism 5 comprises first and second rigid connection members 10, 11, e.g. in the form of circular metal cheek plates that can optionally be connected together by a crimped metal ring 12 and that define a closed housing enclosing a locking device 13 adapted selectively to lock or to release the two connection members 10, 11 in relative rotation about the axis Y.

The locking device 13 has at least one rigid slug 214 that is in the general shape of a circular arc, and that is controlled by a control device 15 which, in the example shown, has a rigid central shaft 16 which is secured to a handle (not shown) that is accessible from outside the seat, and a cam 17 identical or similar to the cam 17 described above for the embodiment shown in FIGS. 1 to 14.

The cam 17 is urged resiliently in the angular direction 17a, e.g. by means of a spiral spring (not shown) which is wound around the shaft 16, one end of the spring being secured to the shaft 16, and its other end being secured to the second connection member 11.

On its periphery, the cam 17 has at least one hook 37 and a cam surface 39. The cam surface 39 is adapted to come into abutment against an abutment surface 233 of the slug 214 so long as the shaft 16 is not actuated to pivot, while holding the slug 214 in the locking position. The hook 37 is adapted to come to engage over an unlocking finger 235 that is part of the slug 214 when the shaft 16 is turned in the direction opposite from the direction 17a, so that it can then move the slug into the unlocked position.

The slug 214 can be in the form of a sheet metal plate that is substantially plane and that extends mainly in the same plane as the cam 17, and in the same plane as a circular set of teeth 21 that is centered on the pivot axis Y, that faces radially inwards, and that is formed in the first connection member 10.

At one of its angular ends, the slug 214 is provided with a set of teeth 222 facing radially outwards and adapted to come into engagement with the above-mentioned set of teeth 21, and, at its other angular end, said slug has a projecting stud 240 which projects axially towards the second connection member 11, and penetrates into a slot 241 provided in said second connection member.

The stud 240 and the slot 241 have respective corresponding half-moon shapes with:
a smooth portion in the shape of a circular arc of small radius, the smooth portion being disposed closer to the pivot axis Y and having its concave side facing radially outwards; and
a toothed portion disposed radially closer to the outside, and forming respectively a second set of teeth 224 on the slug 214 and a toothed locking bearing surface 223 on the second connection member 11, the set of teeth 224 and the locking bearing surface 223 respectively having circularly arcuate shapes that are centered on the axis Y, with the second set of teeth 224 of the slug having a pitch circle that is slightly smaller (e.g. approximately in the range 1% smaller to 5% smaller) than that of the toothed locking bearing surface 223. The set of teeth 223 is continuously in engagement with the locking bearing surface 223.

The stud 240 of the slug 214 is also mounted with a certain amount of radial clearance, e.g. lying in the range three tenths of a millimeter to four tenths of a millimeter in the corresponding slot 241.

By means of these provisions, the slug 214 can pivot to a small extent about the stud 240, e.g. with an amplitude of about 2 degrees, which is sufficient to move the slug from firstly its locking position (shown in FIGS. 36 and 37) in which the set of teeth 222 of said slug is in engagement with the set of teeth 21 of the first connection member 10, and secondly an unlocking position in which said set of teeth 222 is no longer in engagement.

In addition, advantageously, on the inside face, the first connection member 10 can have a guide lip 242 which, in certain relative angular positions of the connection members 10, 11, co-operates with a stud 243 of the slug 214 so as to prevent said slug from going into the locking position.

At the end of re-locking, the slugs self-position on the locking bearing surfaces, by means of the fact that pivoting to a small extent is allowed in a plane perpendicular to the pivot axis Y.

The fourth embodiment of the invention, shown in the rest position in FIGS. 39 to 44 is similar to the variant of FIGS. 15 to 24 and is therefore not described again in detail below.

In the fourth embodiment of the invention, the seat 1 can, for example have a single control handle 6 for controlling the hinge mechanism 5 which again comprises:
a first connection member 10 similar to the connection member of FIGS. 15 to 24, and a second connection member 11 similar to the connection member of FIGS. 15 to 24;
a crimped metal ring 12 or some other means for fastening together the connection members 10, 11; and
a locking device adapted selectively to lock or to release the two connection members 10, 11 in relative rotation about the axis Y.

The locking device 13 comprises at least one rigid slug 14 in the general shape of a circular arc. In the example considered herein, the locking device 13 comprises six rigid slugs distributed angularly at 60° from one another about the axis Y and controlled by a control device 15 comprising a central shaft 16, a cam 317, and a control mask 318 secured together (e.g. by being fitted against one another) and resiliently urged to pivot in the direction 9a by a spring 319, e.g. a spiral spring whose inner end is secured by being fitted against the shaft 16 and whose outer end 319a is fastened, for example, to a stud 319a of the second connection member 11. The cam 317 and the control mask 318 can be made in the form of flat pieces of sheet metal that are cut out and stamped.

The slugs 14 are of general shape similar to the general shape of the slugs of FIGS. 15 to 24, and each of them has two locking shoes 22, 24, e.g. they are in the form of sets of teeth, which are offset in two distinct planes, the first locking shoe 22 of one slug being superposed on the second locking shoe 24 of the adjacent slug. The first locking shoes 22 of the slugs are thus disposed in the plane of the first locking bearing surface 21 of the first locking member 10 so that they can co-operate with said locking bearing surface, by meshing in this example, and the second locking shoes 24 are disposed in the plane of the second bearing surfaces 23 of the second connection member 11, and are adapted to come into engagement with said second bearing surfaces.

Figure 39:
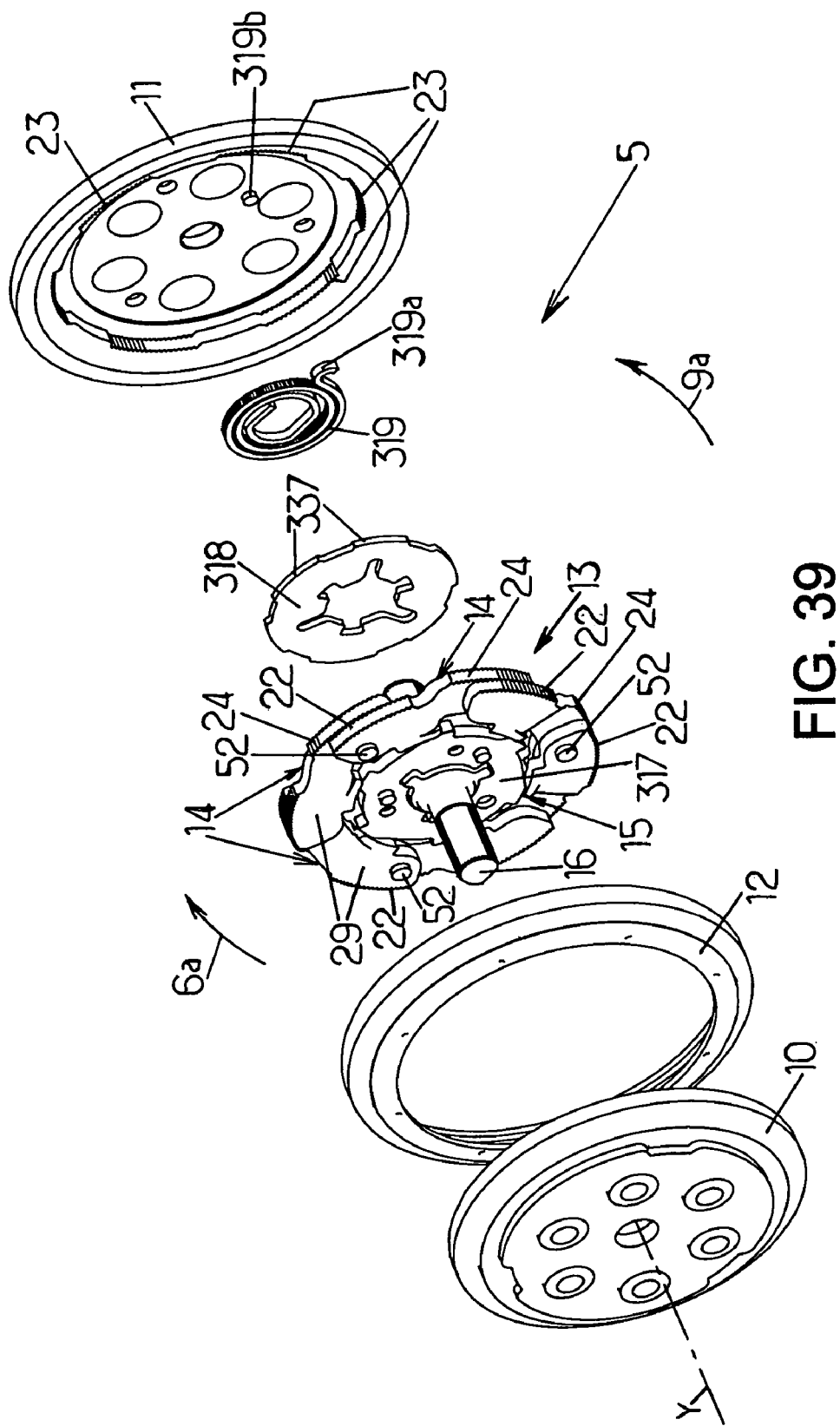
FIGS. 39 and 40 are exploded perspective views of a hinge mechanism in a fourth embodiment of the invention, seen in two opposite directions.
Figure 40:
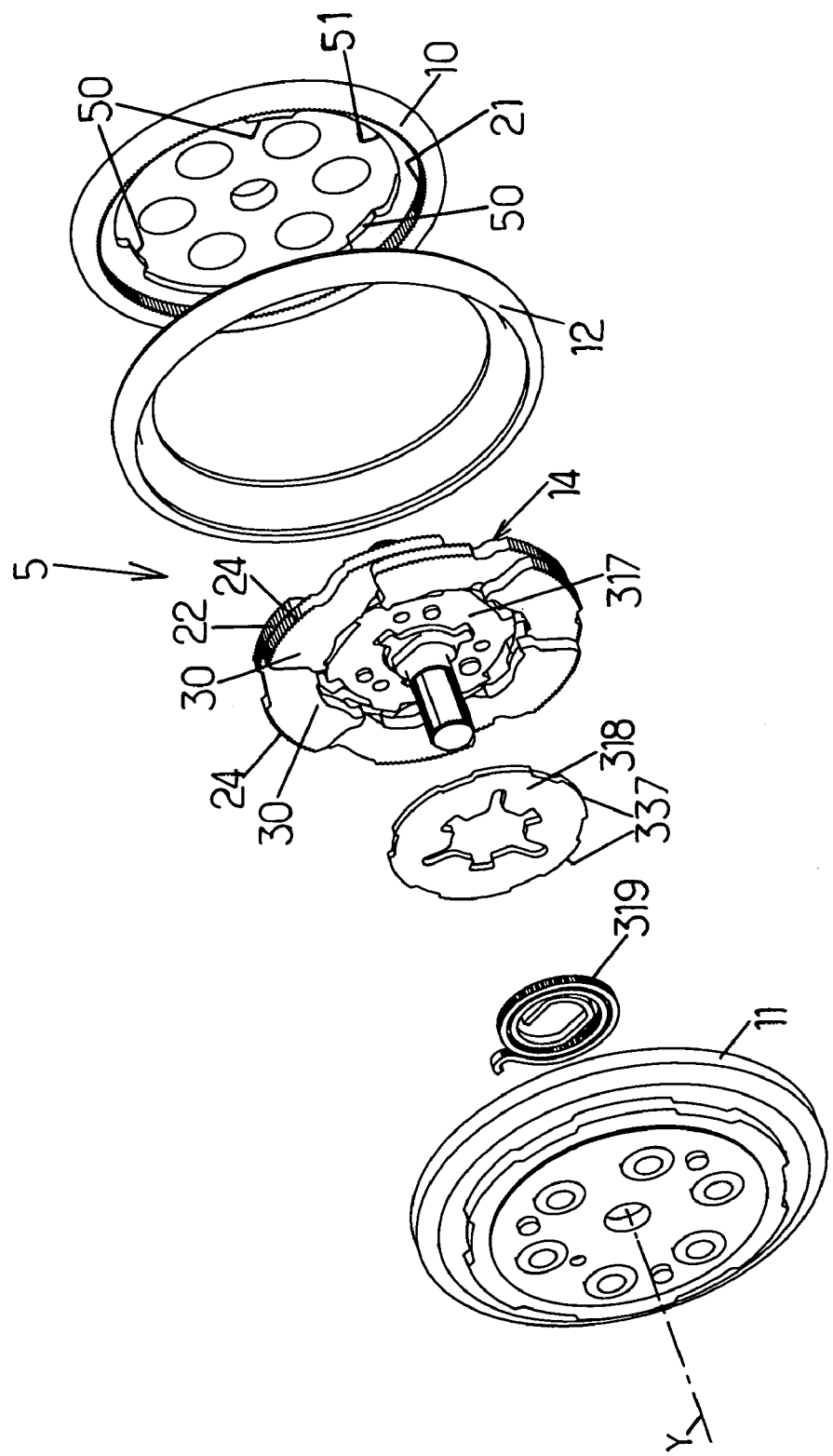
Figure 41:
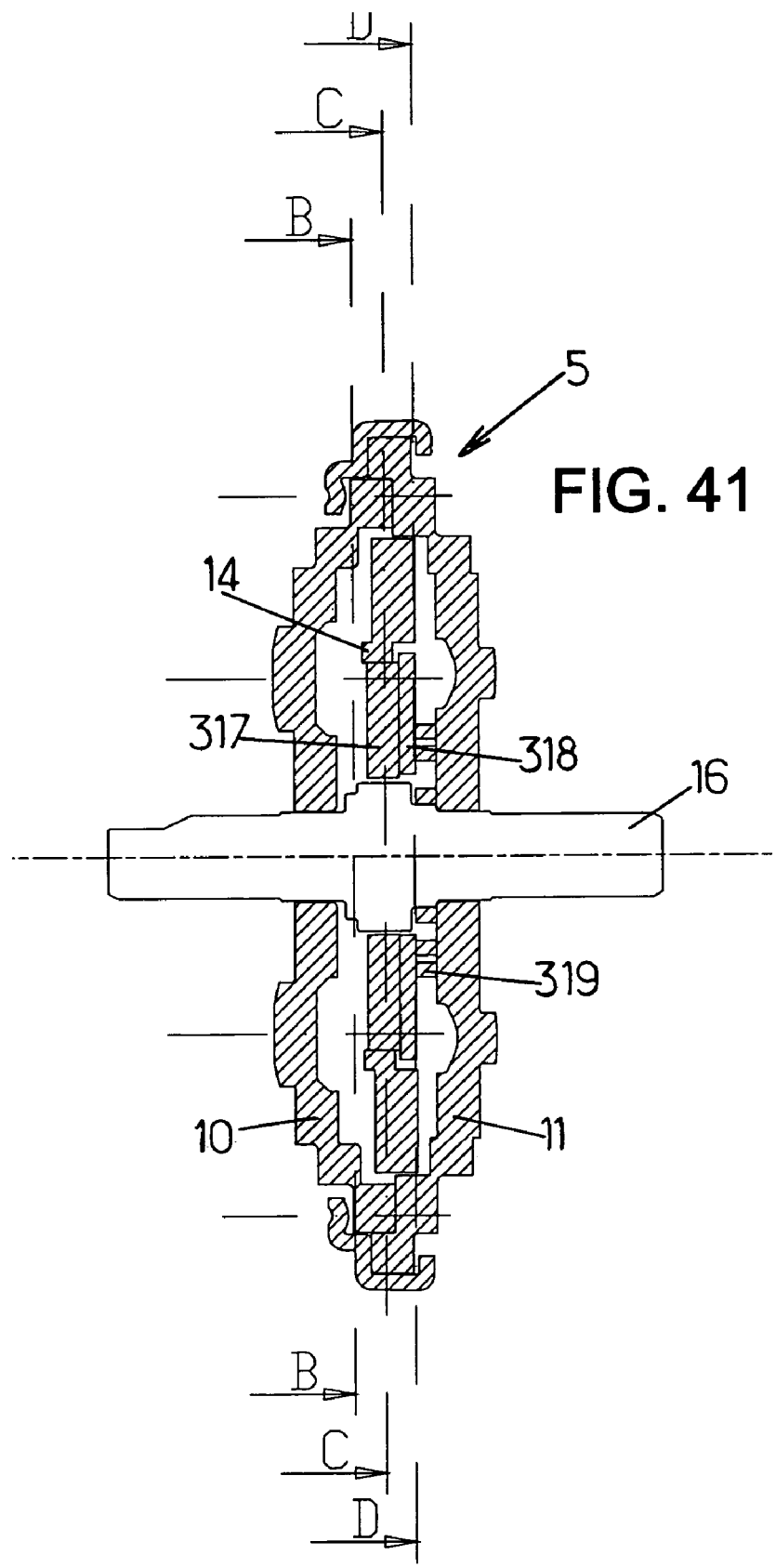
FIG. 41 is an axial section view of the hinge mechanism of FIGS. 39 and 40.
Figure 42:
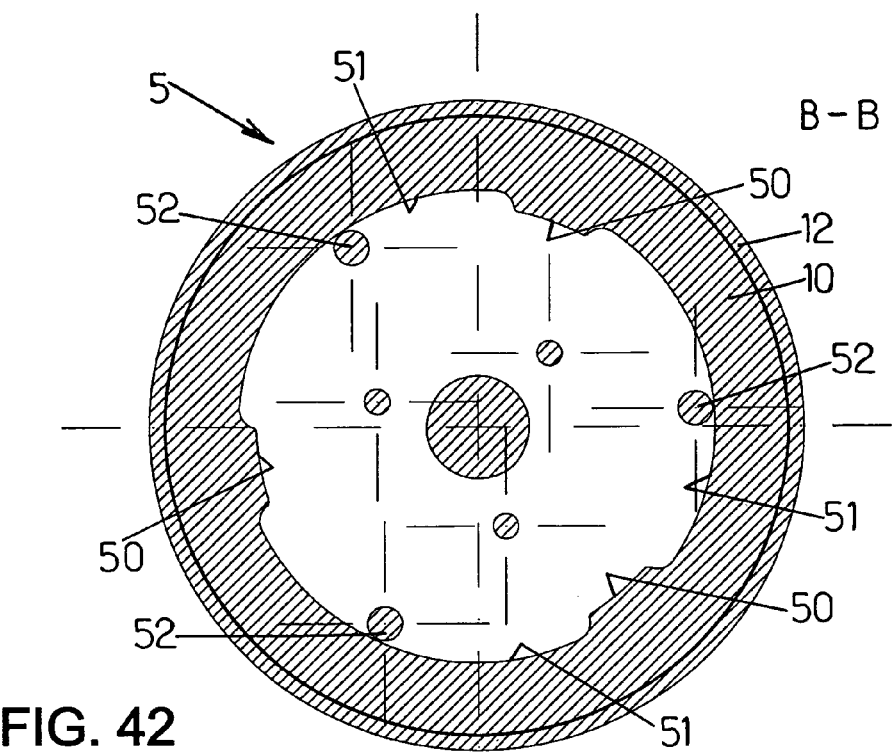
FIGS. 42 to 44 are section views respectively on line B-B, line C-C, and line D-D of the hinge mechanism of FIG. 41, in the rest position.

Unlike in the embodiment shown in FIGS. 15 to 24, the second connection member 11 does not have the guide surfaces 25, the notches 26, and the abutments 27, and the slugs do not have the projecting studs 28. In addition, in the embodiment shown in FIG. 39 et seq., one in every two slugs has a projecting stud 52 (FIG. 39). The three projecting studs 52 of all of the slugs 14 co-operate with respective ones of three circularly arcuate guide surfaces 50 centered on the axis Y and provided inside the first connection member (FIG. 40), in order to prevent the first locking shoes 22 from being locked onto the first locking bearing surface 21 when the connection members 10, 11 are in certain relative angular positions, whereas such locking is allowed by zones 51 of larger diameter provided in the first connection member 10 (see FIG. 42) when the studs 52 are not facing the guide surfaces 50.

Figure 43:
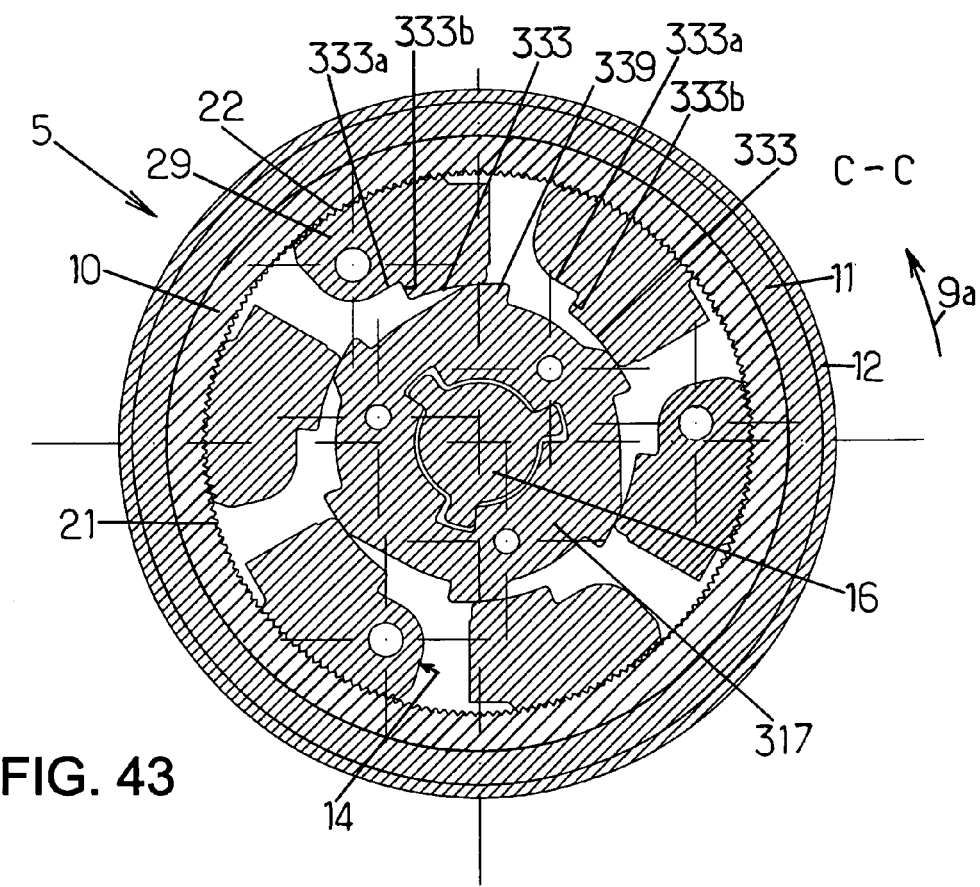
Figure 44:
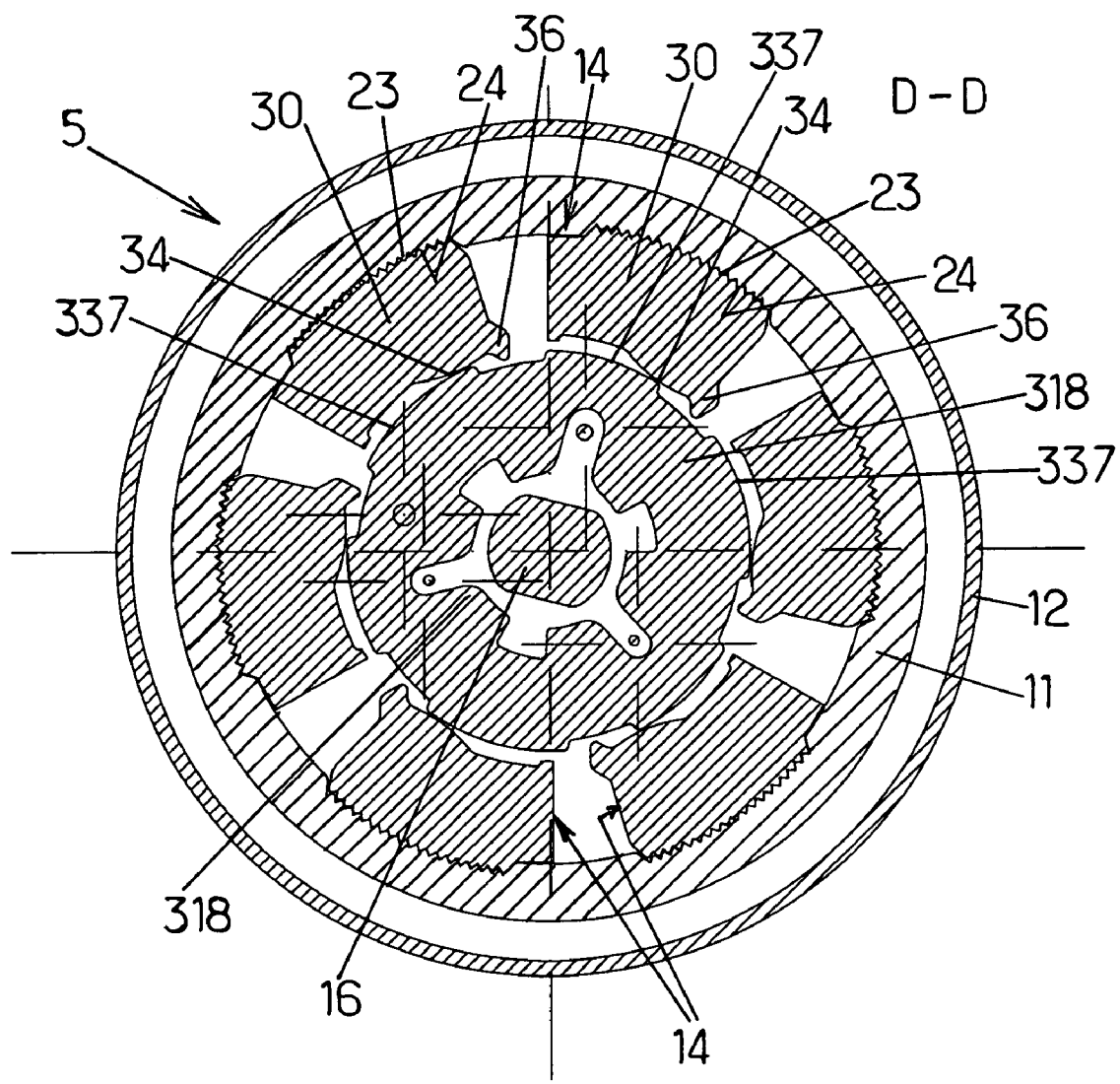
Figure 45:
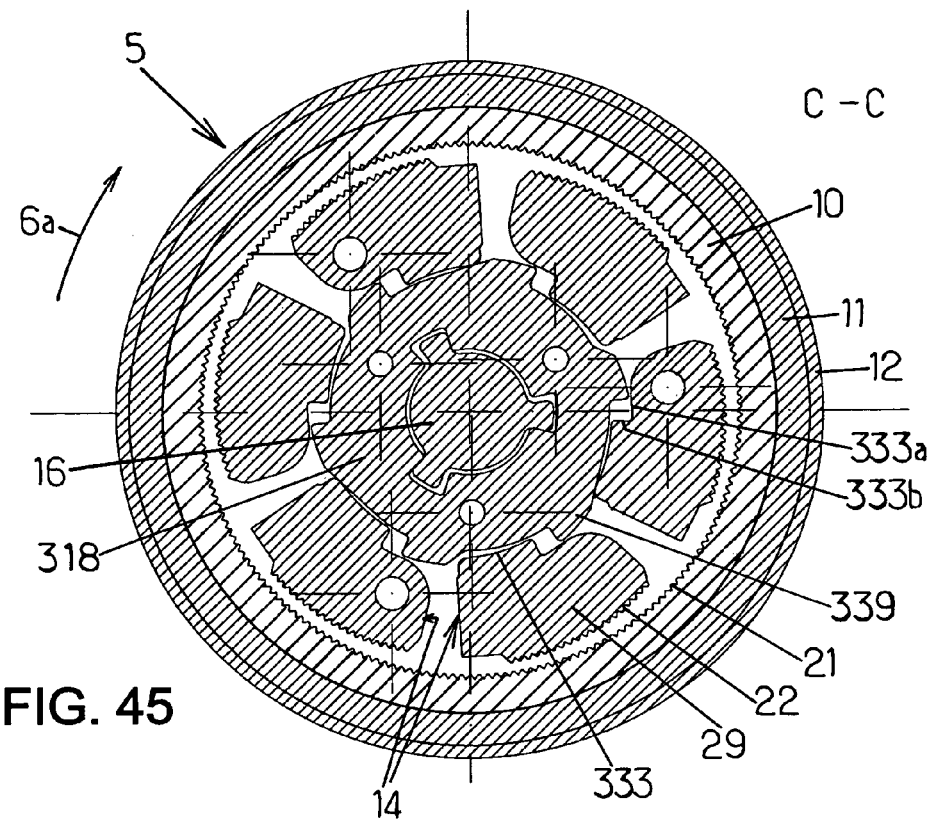
FIGS. 45 and 46 are views respectively similar to FIGS. 43 and 44, showing the hinge while the inclination of the seat back is being adjusted.
Figure 46:
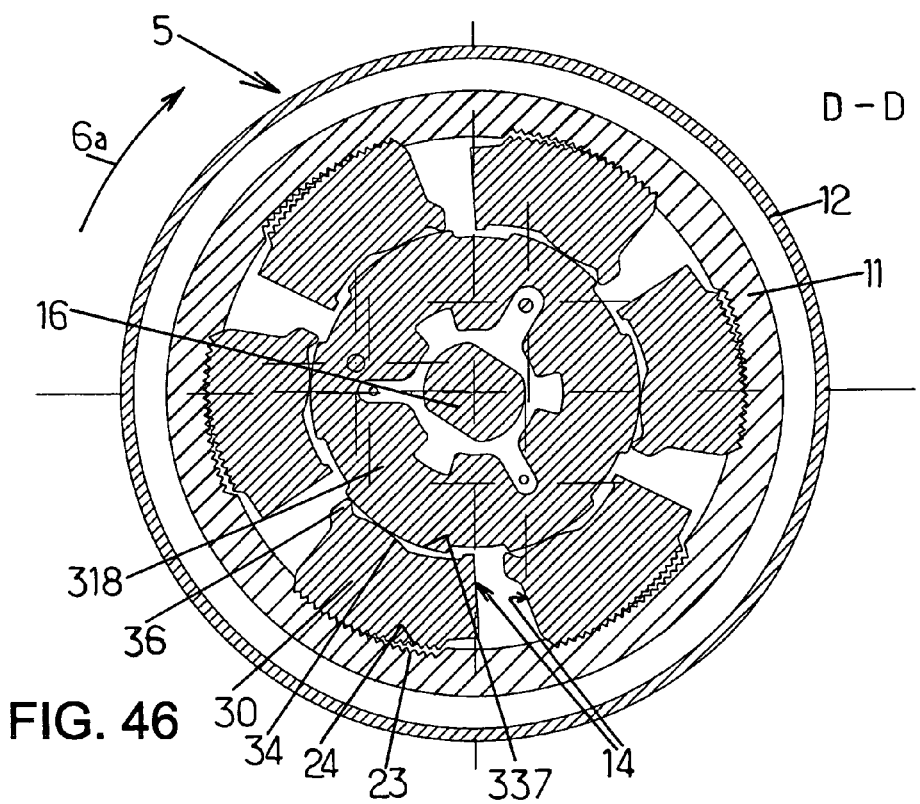

In addition, as shown in FIGS. 43 and 44, the radially innermost portions of the slugs 14 are formed differently from the variant shown in FIGS. 15 to 24. In the fourth embodiment of the invention, the first portion 29 of each slug, which portion carries the first locking shoe 22, has an abutment edge 333 on which a cam surface 339 of the cam 317 comes to bear. At its end opposite from the second portion 30, the first portion 29 of each slug does not have any unlocking fingers, but merely a recess 333a which is connected to the abutment edge 33 by a shoulder 333b angularly facing in the direction 9a.

In addition, as shown in FIG. 44, the second portion 30 of each slug is provided with an unlocking finger 36 that is similar to the unlocking finger described above for the variant shown in FIGS. 15 to 24, and an abutment surface 34 also similar to the above-described abutment surface but preferably having a convex shape with its convex side facing radially inwards.

At rest, each abutment surface 34 is in the vicinity of a respective projecting cam edge 337 formed at the periphery of the control mask 318. Thus, in the example considered herein, the control mask 318 has six cam edges 337. In the rest position shown in FIGS. 42 to 44, the cam surfaces 339 of the cam 317 bear radially outwards against the abutment surfaces 333 of the entire set of slugs, in a position that is substantially centered relative to each slug, so that the two locking shoes 22, 24 of each slug are thus held in engagement with respective ones of the locking bearing surfaces 21, 23.

Conversely, when a user releases the hinge mechanism 5, e.g. by actuating the handle 6 in the direction indicated by arrow 6a, the cam surfaces 339 of the cam 318 no longer act on the abutment edges 33 of the slugs, and they penetrate into the recesses 333a, whereas the cam edges 337 of the control mask are in radial abutment on the abutment surfaces 34 of the slugs, so that the second locking shoes 24 remain in engagement with the second locking bearing surfaces 23. In addition, the cam edges 337 of the control mask come into abutment against the corresponding unlocking fingers 36 of the slugs, thereby causing the slugs 14 to pivot, so that the first locking shoes 22 of the slugs no longer co-operate with the first locking bearing surface 21.

In a fifth embodiment (not shown), the seat can have a hinge mechanism that differs from the hinge mechanism of the first embodiment essentially by the fact that it has neither ramps 50 nor studs 52 for holding the slugs in the unlocked position while the seat back is being tilted to facilitate access to the back seats. In this case, the hinge mechanism makes it possible to control adjustment of the seat back relative to the seat proper for comfort purposes only.

What is claimed is:

1. A hinge mechanism designed to enable two elements to be adjusted angularly relative to each other, said hinge mechanism comprising:

first and second rigid connection members mounted to pivot relative to each other around an axis of rotation and designed to be connected to respective ones of the two elements to be adjusted, each of said first and second connection members having at least first and second locking bearing surfaces that are circular and that face radially, the first and second locking bearing surfaces being superposed in adjacent and distinct planes that are perpendicular to the pivot axis;

a plurality of similar rigid slugs distributed angularly about the pivot axis and disposed facing said first and second locking bearing surfaces, each slug including a first locking shoe adapted to come into engagement with the first locking bearing surface only, and a second locking shoe adapted to come into engagement with the second locking bearing surface only, said first and second locking shoes being offset angularly relative to each other about the pivot axis, the first locking shoe being disposed in the same plane as the first locking bearing surface and the second locking shoe being disposed in the same plane as the second locking bearing surface; and a control device adapted to move each slug for selectively locking and releasing the first and second connection members relative to each other, by selectively putting said first and second connection members in engagement with said first and second locking bearing surfaces;

wherein the first locking shoe of one of the slugs is superposed at least in part on the second locking shoe of at least an adjacent slug.

2. A mechanism according to claim 1, in which each slug is adapted to self-position by pivoting to a small extent in a plane perpendicular to the pivot axis, thereby guaranteeing good locking on the corresponding locking bearing surface.

3. A hinge mechanism according to claim 1, in which the first and second locking bearing surfaces face radially inwards relative to the pivot axis.

4. A hinge mechanism according claim 1, in which the first and second locking bearing surfaces comprise respective ones of first and second sets of teeth and the slugs have teeth adapted to come into engagement with said first and second sets of teeth.

5. A hinge mechanism according to claim 1, in which the first and second locking bearing surfaces have the same first radius, the first and second locking shoes being in the shape of circular arcs having the same second radius.

6. A hinge mechanism according to claim 5, in which the second radius is equal to or close to the first radius.

7. A hinge mechanism according to claim 5, in which the first and second locking bearing surfaces have sets of teeth that have a pitch circle radius substantially equal to said first radius, the first and second locking shoes having circularly arcuate sets of teeth having a pitch circle radius substantially equal to the second radius.

8. A hinge mechanism according to claim 5, in which the first and second radii are adapted so that each slug can self-position and so that each slug's first and second locking shoes are both in engagement with the first and second locking bearing surfaces.

9. A hinge mechanism according to claim 8, in which the second radius is smaller than the first radius by an amount in the range 1% to 5%.

10. A hinge mechanism according to claim 1, in which the control device comprises at least one pivotally mounted first cam adapted to move each slug radially.

11. A hinge mechanism according to claim 1, in which:
the first and second locking bearing surfaces face axially inwards relative to the pivot axis;
the control device comprises first and second pivotally mounted cams that are urged resiliently towards respective locking positions in which said first and second cams normally hold the first and second locking shoes of each slug in engagement respectively with the first and second locking bearing surfaces, the control device further including at least one actuating member adapted to move the first cam towards an unlocking position; and
each slug is adapted to pivot about each slug's second locking shoe towards a first retracted position in which the first locking shoe is not in engagement with the first locking bearing surface, when the second cam is in a locking position and the first cam is in an unlocking position.

12. A hinge mechanism according to claim 11, in which the first cam is adapted to positively driving each slug to pivot into the first retracted position when said first cam is moved from the locking position to the unlocking position.

13. A hinge mechanism according to claim 12, in which the first cam has a cam surface and a hook for each slug, the cam surface of the first cam being adapted to act by a camming effect on the corresponding slug so as to hold the first locking shoe in engagement with the first locking bearing surface when the first cam is in the locking position, and the hook of the first cam being adapted to engage over a first unlocking finger that is part of the corresponding slug in order to cause the corresponding slug to pivot towards the first retracted position when the first cam is moved towards the unlocking position.

14. A hinge mechanism according to claim 13, in which the first cam can be moved in a first angular direction from the locking position to the unlocking position, and the slugs are in the general shape of a circular arc that extends angularly between two ends that carry respective ones of the first and second locking shoes, the first unlocking finger extending in slanting manner radially inwards and in a second angular direction that is opposite to the first angular direction.

15. A hinge mechanism according to claim 14, wherein the first cam has a cam surface and a hook adjacent to each other for each slug, and said first cam has a respective recess between the cam surface and the hook corresponding to the same slug, the first unlocking finger of said slug projecting into said recess.

16. A hinge mechanism according to claim 11, in which each slug is adapted to pivot about the slug's first locking shoe towards a second retracted position in which the second locking shoe is not in engagement with the second locking bearing surface, when the first cam is in a locking position and the second cam is in an unlocking position.

17. A hinge mechanism according to claim 16, in which the second cam is adapted to drive each slug positively to pivot into the second retracted position when said second cam is moved from the locking position to the unlocking position.

18. A hinge mechanism according to claim 17, in which the second cam has a cam surface and a hook for each slug, each cam surface of the second cam being adapted to act by a camming effect on the corresponding slug so as to hold the second locking shoe in engagement with the second locking bearing surface when the second cam is in the locking position, and each hook of the second cam being adapted to engage over a second unlocking finger that is part of the corresponding slug so as to cause the corresponding slug to pivot towards the second retracted position when the second cam is moved towards the unlocking position.

19. A hinge mechanism according to claim 18, in which the second cam can be moved in a second angular direction from the locking position to the unlocking position, and the slugs are in the general shape of a circular arc that extends angularly between two ends carrying respective ones of the first and second locking shoes, the second unlocking finger extending in slanting manner radially inwards and in a first angular direction opposite to the second angular direction.

20. A hinge mechanism according to claim 19, wherein the second cam has a cam surface and a hook that are adjacent to each other for each slug, and said second cam having a respective recess between the cam surface and the hook corresponding to the same slug, the second unlocking finger of said slug projecting into said recess.

21. A hinge mechanism according to claim 16, in which the actuating member is mounted to pivot about the pivot axis and is adapted to drive the first cam from the locking position to the unlocking position when said actuating member is moved in a first angular direction from a rest position, and the second cam can be moved from the locking position to the unlocking position by said actuating member when said actuating member pivots in a second angular direction from the rest position, said actuating member being connected with lost motion to the first and second cams so that pivoting the actuating member in the first angular direction into the releasing position of the second cam does not interfere with the second cam, and so that pivoting the actuating member in the second angular direction into the releasing position of the second cam does not interfere with the first cam.

22. A hinge mechanism according to claim 21, in which the actuating member comprises a shaft passing through the first and second cams with clearance, and provided with at least one actuating finger penetrating into recesses provided in respective ones of the first and second cams and offset angularly relative to each other.

23. A hinge mechanism according to claim 22, in which the first and second cams are connected to the shaft by respective ones of first and second springs, the first spring urging the first cam in the second angular direction relative to the shaft, and the second spring urging the second cam in the first angular direction relative to the shaft.

24. A hinge mechanism according to claim 23, in which the first and second cams are connected to each other independently of the actuating finger via an additional connection limiting the extent to which said first and second cams can pivot angularly relative to each other.

25. A hinge mechanism according to claim 16, in which the second connection member includes at least:
a latching zone making it possible for the slugs to come into engagement with the second locking bearing surface; and a circularly arcuate guide surface centered on the pivot axis and facing radially inwards, said guide surface being adapted to guide the slugs while holding said slugs in the second retracted position when said slugs are not in register with the latching zone.

26. A hinge mechanism according to claim 25, which each slug has a stud projecting towards the second connection member, said stud being adapted to come into abutment against the guide surface while holding the slug in the second retracted position when said slug is not in register with the latching zone, and said slug being adapted to penetrate into a notch provided in the second connection member when the slug is in register with the latching zone.

27. A hinge mechanism according to claim 25, in which the second connection member has at least one abutment adapted to enable the slugs to move relative to said second connection member in one angular direction only, when the slugs are in the second retracted position.

28. A hinge mechanism according to claim 11, in which each slug is formed by a sheet metal plate having first and second flat portions carrying respective ones of the first and second locking shoes, and connected together via a fold, the first and second flat portions of each slug being disposed in respective ones of the planes of the first and second locking bearing surfaces, and the first flat portion of each slug being superposed at least in pan on the second flat portion of an adjacent locking slug, the first and second cams being flat pieces of sheet metal lying in respective ones of the planes of the first and second locking bearing surfaces.

29. A hinge mechanism according to claim 1, in which:
the first and second locking bearing surfaces face radially inwards relative to the pivot axis; and
the control device comprises a pivotally mourned cam superposed on a control mask and secured to said control mask, said cam and said mask being resiliently urged towards a locking position in which the cam holds the first and second locking shoes in engagement respectively with the first and second locking bearing surfaces, the control device further comprising at least one actuating member adapted to move the cam towards an unlocking position;
the slugs are adapted to pivot about the second locking shoe thereof towards a retracted position in which the first locking shoe is not in engagement with the first locking bearing surface, when the cam is in an unlocking position; and
the control mask is adapted to act on the slugs by. causing them to pivot about the second locking shoe thereof towards said retracted position when the cam is in an unlocking position.

30. A vehicle seat comprising a seat proper and a seat back connected together by at least one hinge mechanism according to any preceding claim.

\* \* \* \* \*